(12) United States Patent
Rosenberg et al.

(10) Patent No.: US 11,393,276 B2
(45) Date of Patent: Jul. 19, 2022

(54) SYSTEM FOR GENERATING A CUSTOM HAIR DYE FORMULATION

(71) Applicant: L'Oreal, Paris (FR)

(72) Inventors: Debra Rosenberg, New York, NY (US); Paul Gambutti, New York, NY (US); Christopher Hipple, New York, NY (US); Florent Valceschini, Paris (FR); Richard Besen, New York, NY (US); Guive Balooch, New York, NY (US); Jennifer Lee, New York, NY (US); Joseph Kassman, Clark, NJ (US); Hugo Lavoie, Ville St-Laurent (CA)

(73) Assignee: L'Oreal, Paris (FR)

( * ) Notice: Subject to any disclaimer, the term of this patent is extended or adjusted under 35 U.S.C. 154(b) by 296 days.

(21) Appl. No.: 16/806,974

(22) Filed: Mar. 2, 2020

(65) Prior Publication Data

US 2020/0279449 A1 Sep. 3, 2020

Related U.S. Application Data

(60) Provisional application No. 62/812,887, filed on Mar. 1, 2019.

(51) Int. Cl.
*G06Q 30/06* (2012.01)
*G07F 13/06* (2006.01)
(Continued)

(52) U.S. Cl.
CPC ............ *G07F 13/06* (2013.01); *A45D 44/005* (2013.01); *G05B 19/41875* (2013.01);
(Continued)

(58) Field of Classification Search
CPC ............ A45D 44/005; A45D 2044/007; G06Q 30/0641; G06Q 30/0621; G07F 13/06
(Continued)

(56) References Cited

U.S. PATENT DOCUMENTS

| 9,007,588 B1* | 4/2015 | Igarashi | A45D 44/005 |
| | | | 356/402 |
| 2015/0021356 A1* | 1/2015 | Witchell | A45D 44/005 |
| | | | 222/23 |
| 2016/0267403 A1* | 9/2016 | Hoffart | G06Q 30/06 |

FOREIGN PATENT DOCUMENTS

| WO | WO 86/05374 A1 | 9/1986 |
| WO | WO 2007/093952 A1 | 8/2007 |

(Continued)

OTHER PUBLICATIONS

International Search Report and Written Opinion dated May 28, 2020 in PCT/US2020/020655, 14 pages.

*Primary Examiner* — Timothy R Waggoner
(74) *Attorney, Agent, or Firm* — Oblon, McClelland, Maier & Neustadt, L.L.P.

(57) ABSTRACT

A system is provided for generating a custom hair dye formulation to be dispensed into a single customer container for a particular customer. The system establishes a connection with a user device of the particular customer over a network, receives a selection of a preferred type of expertise of a colorist, determines an available colorist that corresponds to the preferred type of expertise, establishes a video communication session between the particular customer and a colorist device of the determined colorist, causes display of a customer interface to the customer, causes display of a colorist interface to the colorist device, and transmits the generated custom hair dye formulation to a fill site, via the network.

1 Claim, 43 Drawing Sheets

(51) Int. Cl.
  *G05B 19/418*     (2006.01)
  *A45D 44/00*      (2006.01)
(52) U.S. Cl.
  CPC ..... *G06Q 30/0621* (2013.01); *G06Q 30/0641* (2013.01); *G05B 2219/32368* (2013.01)
(58) Field of Classification Search
  USPC ........................................................ 700/233
  See application file for complete search history.

(56) References Cited

FOREIGN PATENT DOCUMENTS

| | | |
|---|---|---|
| WO | WO 2013/036618 A1 | 3/2013 |
| WO | WO 2018/089356 A1 | 5/2018 |

* cited by examiner

FILL LINE & PERSONALIZATION - OVERVIEW
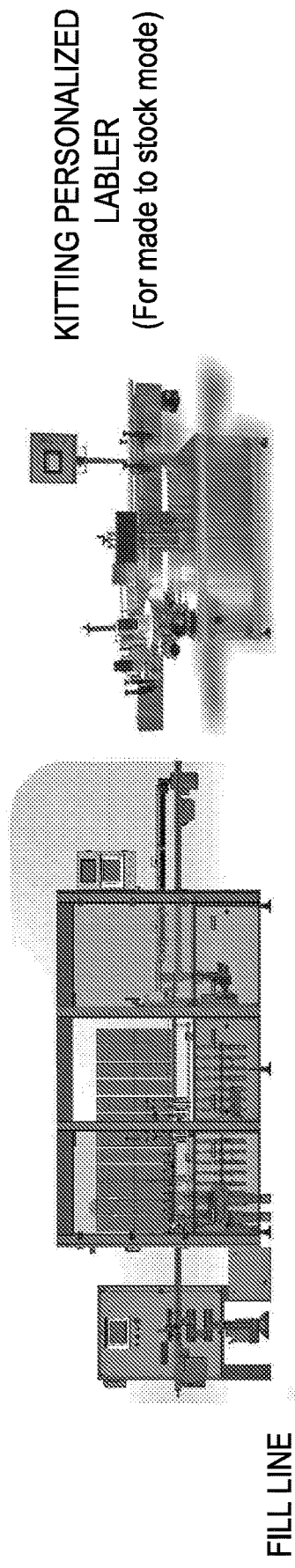
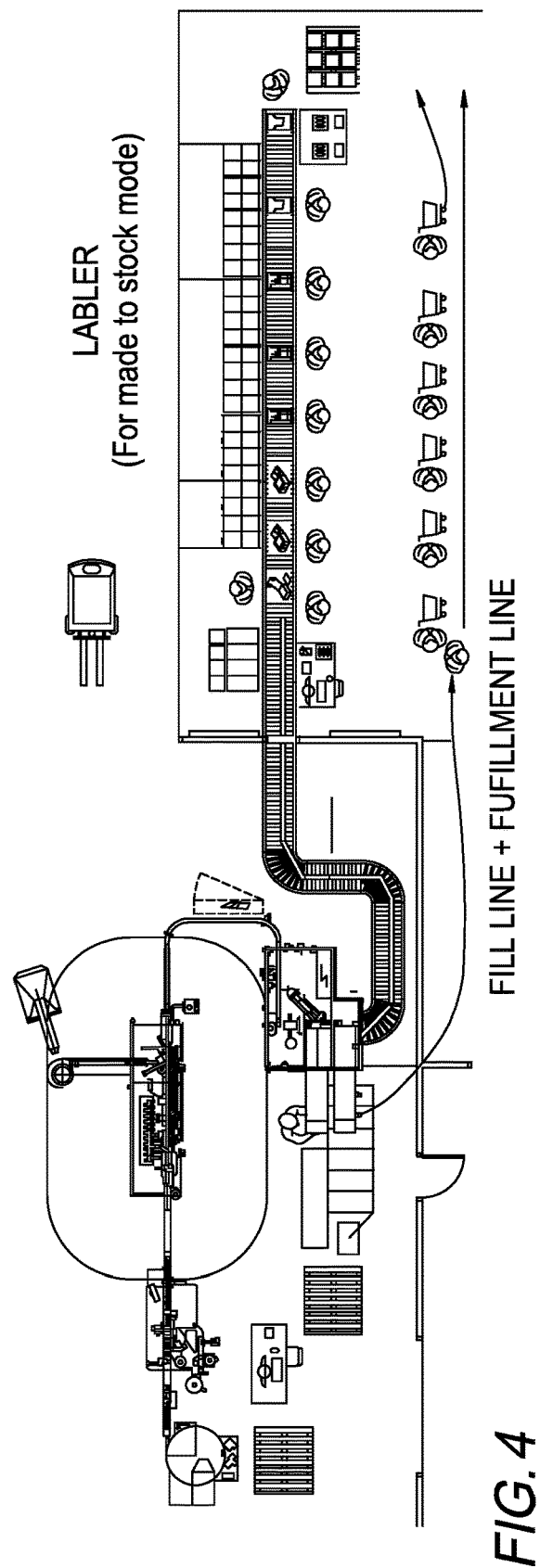
FIG. 4

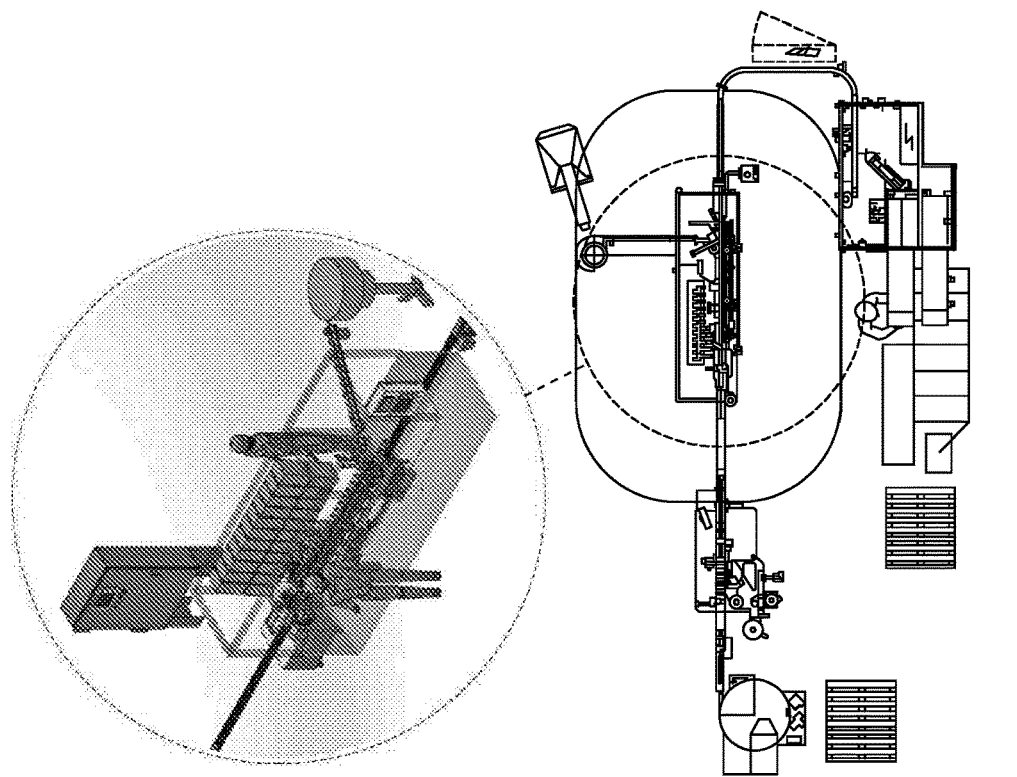

PERSONALIZED FILL LINE

KEY STATISTICS:

- Fastest personalized manufacturing to date (10 units per minute). 1.5M units/year assuming 2*8 hours shifts
- 100% traceability and full unit serialization
- In-line quality checks
- Highly automated (<1 Full Time Operator required)
- Highly adaptable to allow for new dye colors in future
- Directly linked to kitting line
- Internet connected per Industry 4.0 stsndards

| Year | Machines needed | Dye Bottle QTY |
|---|---|---|
| 2019 | 1 | 273K |
| 2020 | 1 | 1.0M |
| 2021 | 1 (assuming triple shifts) | 1.8M |
| 2022 | 2 | 2.5M |

FIG. 5

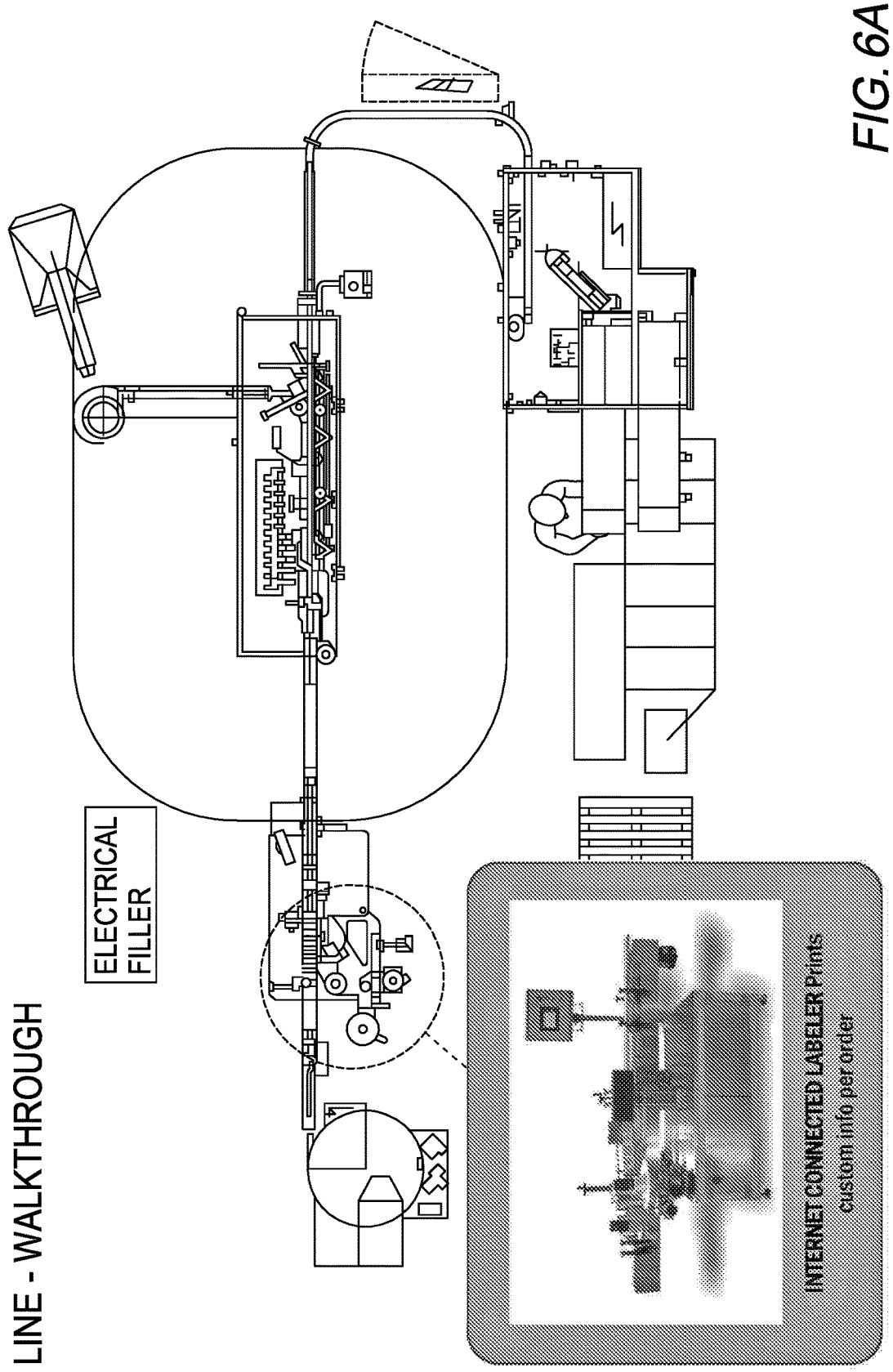

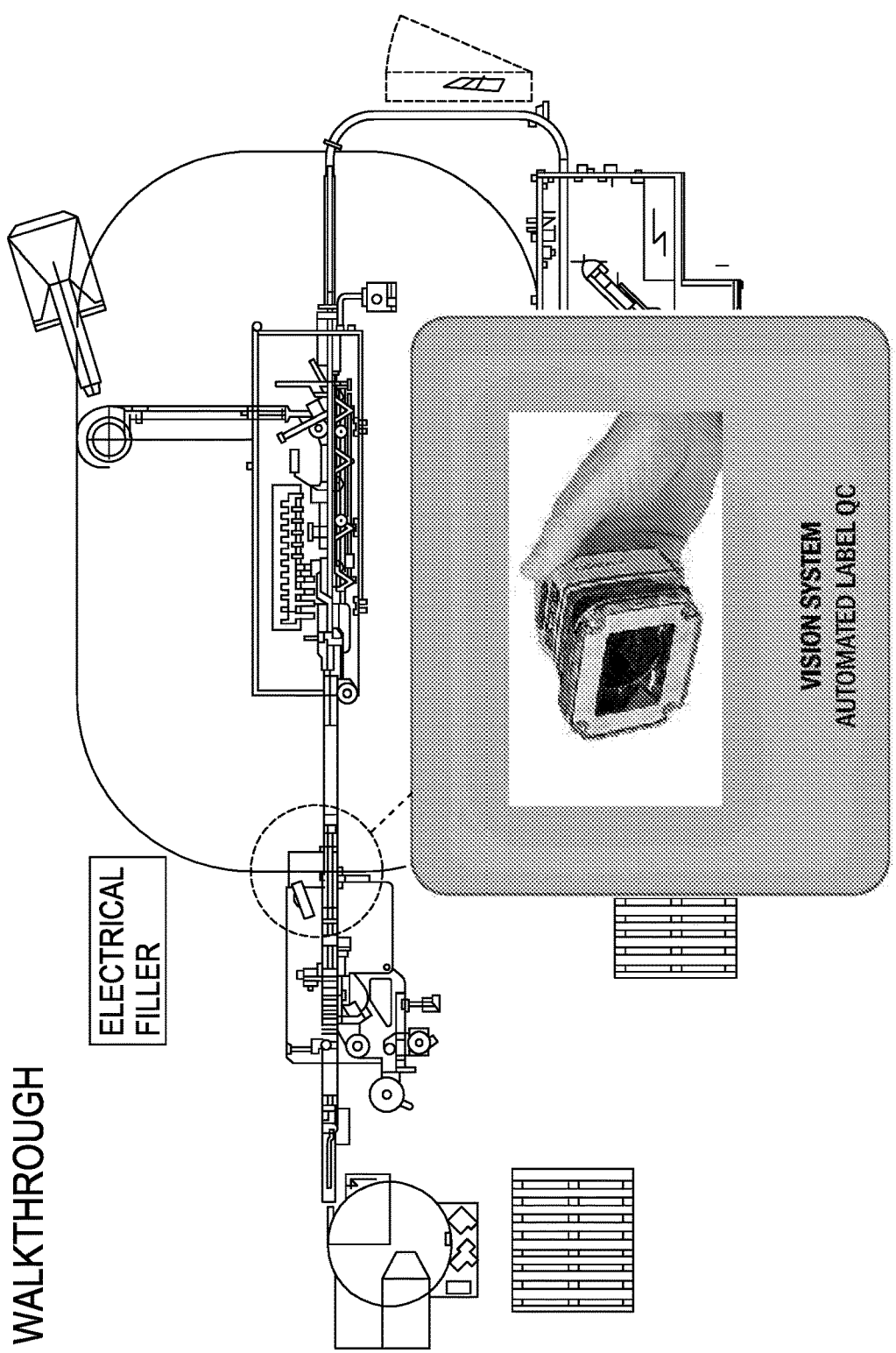

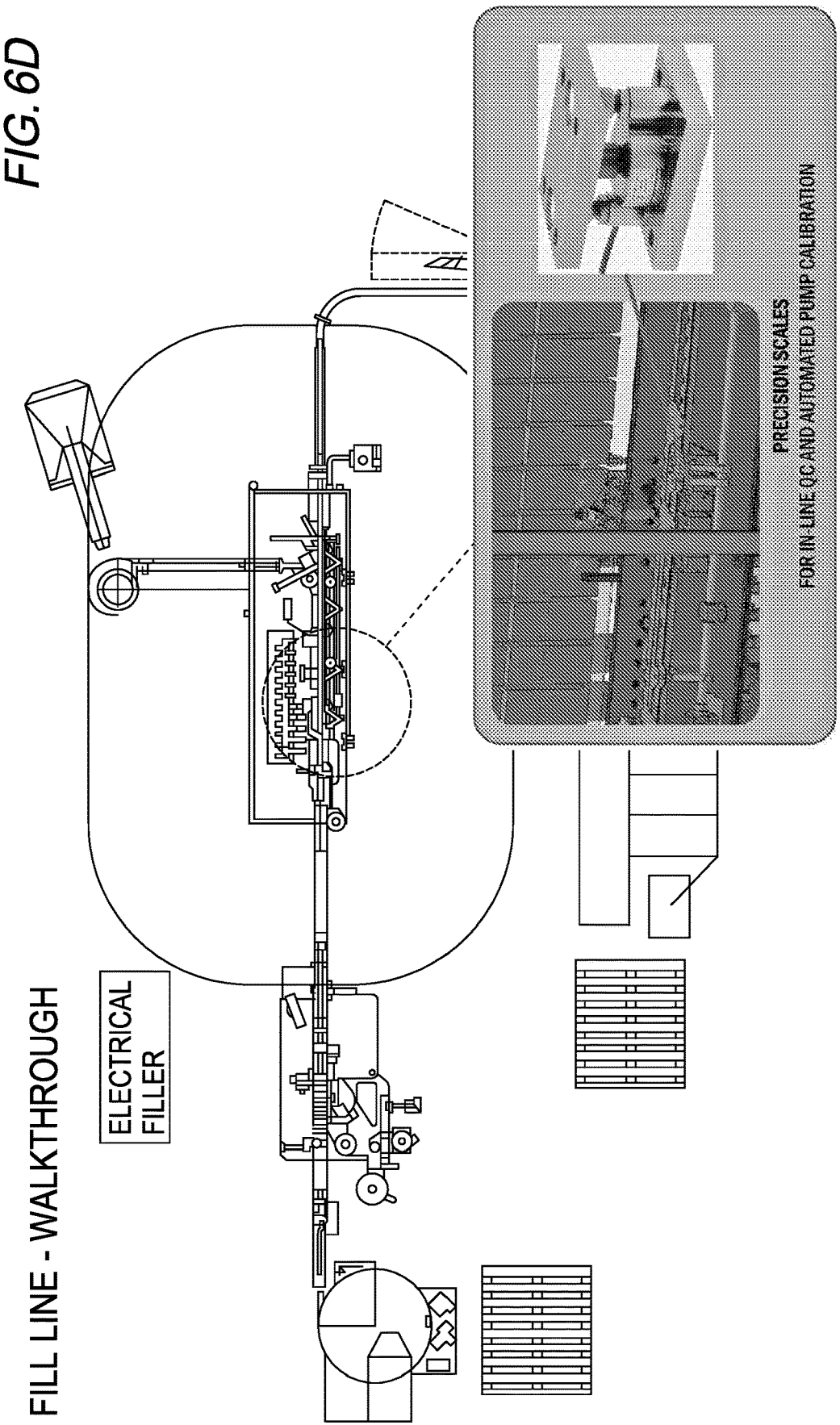

BULK CONTAINER REQUIREMENTS

- Related to contain XP (explosive) material
- Approved for international shipping and easy topelletize
- Provide for quick swapping capability to reduce fill line downtime
- Easily disposable/recyclable
- Optimally sized for compound usage rates while remaining ergonomic for operators
- Chemical compatibility with 17+compounds in long term storage
- Light blocking
- Completely airtight to prevent oxidation
- Reasonably priced to not affect FG piece price
- Long term availability from trusted supplier

*FIG. 8B*

MUCK - REGULAR USE IBC + CORRUGATE

MARKING/LABELING:
- RM 617 (REA)
- Monochrome compounds (15-24 types)

SIZE:
- 10.6L capacity, target fill = ~10L

GENERAL CONSTRUCTION:
- The bulk containers consist of a bag+sealed valve assembly
- The bulk tag would be shipped inside a corrugate box with an opening for the valve BAG CONSTRUCTION:
- Bag film: minimum 2-ply engineered materials
    - Scholle Flexituff for 02 barrier and compatibility as this ply is in contact with material
    - Scholle HyBar for UV blocking
- Value:
    - Scholle Sentry SafeLock: value is foil sealed and is adapted to work with a "probe" on the MUCH fill machine. Valve + from watertight/airtight seal
    - Seal this video: http://www.scholleipn.com/scholle-ipn-sentry-safelock-fitment-how-t-works/
- See attachments:
    - Scholle-ipn-sentry-4.jpg (overview image of bag + valve construction)
    - L'Orel Potential Bag_10.6L.pdf (drawing of 10.6L bag)
    - FlexiTuff20.pdf & HyBar45HF.pdf (film materials datasheets)
    - Sentry SafeLock on 900 Spout, 20181018.pdf (valve datasheet)

*FIG. 11A*

CORRUGATE:
- Srandard corrugate with handhold cutouts and cutout for bag spout
- Confirm dimensions from Scholle: of roughly 7.725" x 8" x 11.5"
- See attachment: Corrugate_mockup_v01.pdf (Sizeestimate for reference only, not final)

MARKING/LABELING:
- The inner bag as well as the corrugate should include a label that identifies the bag contents
- The outer label (on the corrugate) will contain human readable text (contents, expiration date, batch info) as well as 2D barcode with the same information encoded
- See attachment: Corrugate_mockup_vD1.pdf SHIPPING:
- Would plan to ship palletized (pending review) - ESTIMATE 90 boxs/pellet

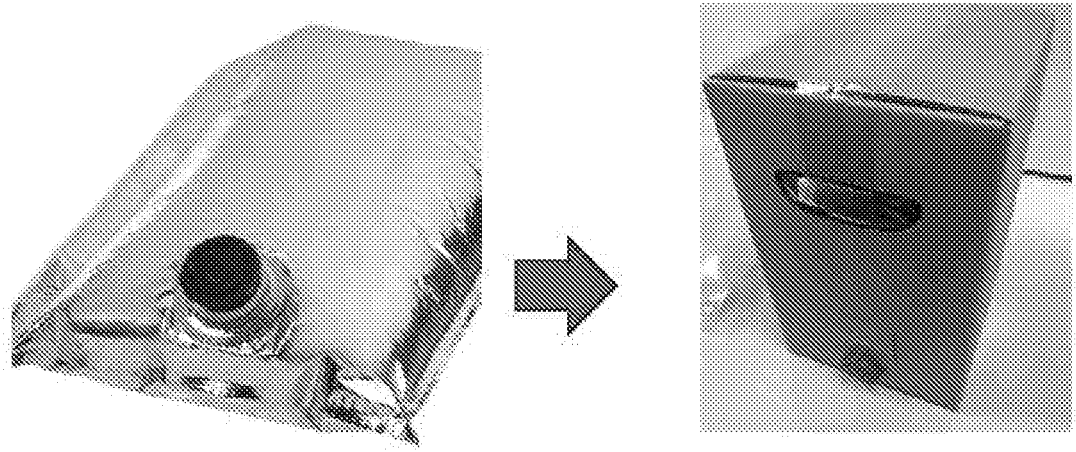

FIG. 11B

MUCK - HEAVY USE IBC

MATERIALS TO FILL:
- Clear Base compounds

SIZE:
- 1325 L capacity, target fill = ~1000L

GENERAL CONSTRUCTION:
- Industrial tote lined with bag + Cap

TOTE:
- Hoover 1325L tote (currently used in MTL and Bocchi)
- See attachment:
  - Metal Liquitote drawing.pdf
  - Liquitote-IBC-Tanks.pdf (look at 1325L option)

LINER CONSTRUCTION:
- Bag film: minimum 3-ply engineered materials
  - FreedomMFG liner (Currently used in Montreal plant) - TBD per compat

MARKING/LABELING:
- Outer label (on the tote) will contain human readable text (contents, expiration date, batch info) as well as a 2D barcode with the same information encoded

SHOPPING:
- Would ship non-palletized
- to recycle, liner could be disposed, and tote shipped empty back to Montreal for refill

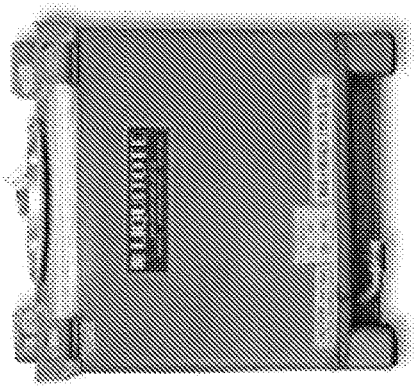

CLOCK ATTACHMENTS TO OPEN

*FIG. 12*

MUCK - IBC FILLING EQUIPMENT - PRODUCTION

- minute). 1.5M units/year assuming 2*8 hours shifts
- Fills the bag
- Caps the bag with foil sealed valve
- Has capability to flush with nitrogen or create vacuum

MUCH - DIRECT rm INGREDIENTS

MATERIALS TO PURCHASE:
- Ammonia
- 14B

SIZE:
- Ammonia: 200L drum
- 14B: 6L aluminum bottle

GENERAL CONSTRUCTION:
- industrial pre-DOT approved containers
-

FILLING:
- At vendor (Ammonia Lab supplier like WD Service Co:\; 14B Chimex)

MARKING/LABELING:
- Ammonia: 200L drum
- 14B: 6L aluminum bottle

SHIPPING:
- Would ship non-palletized

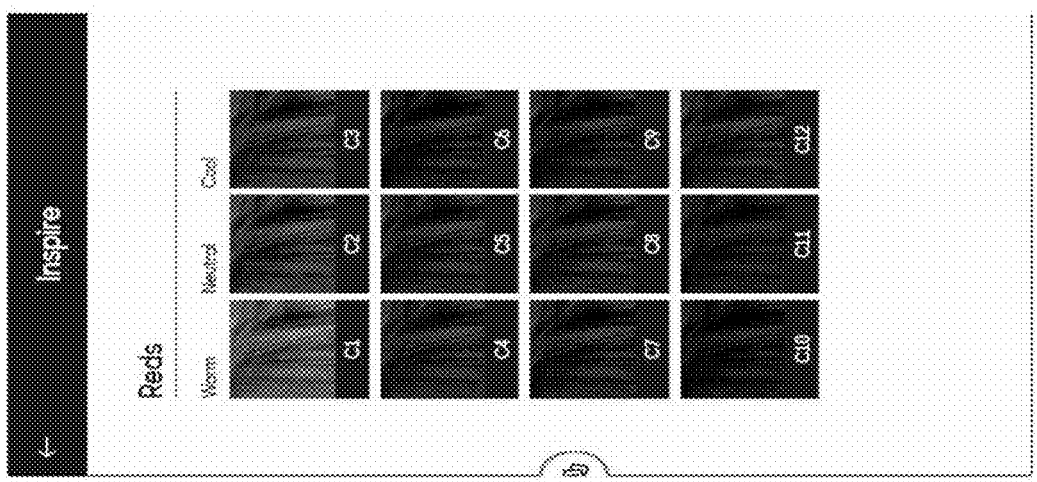
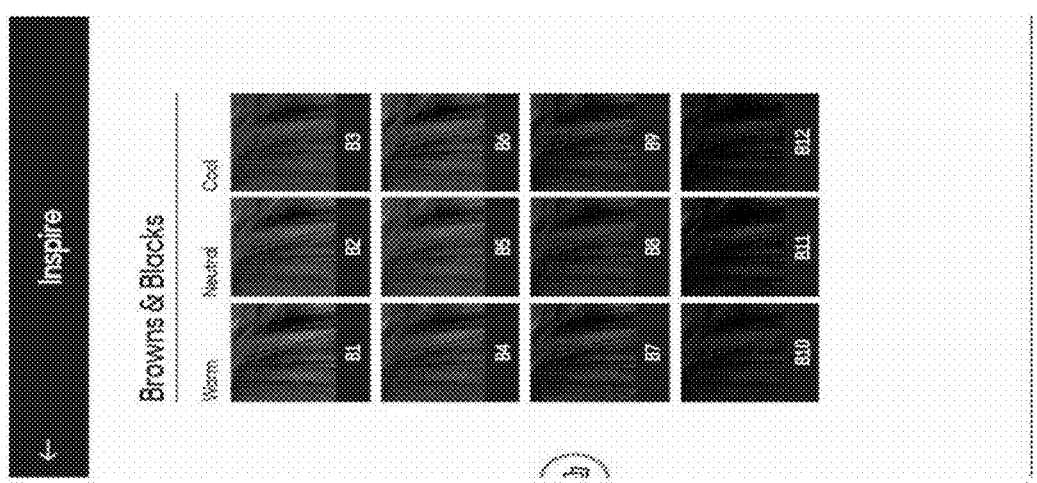
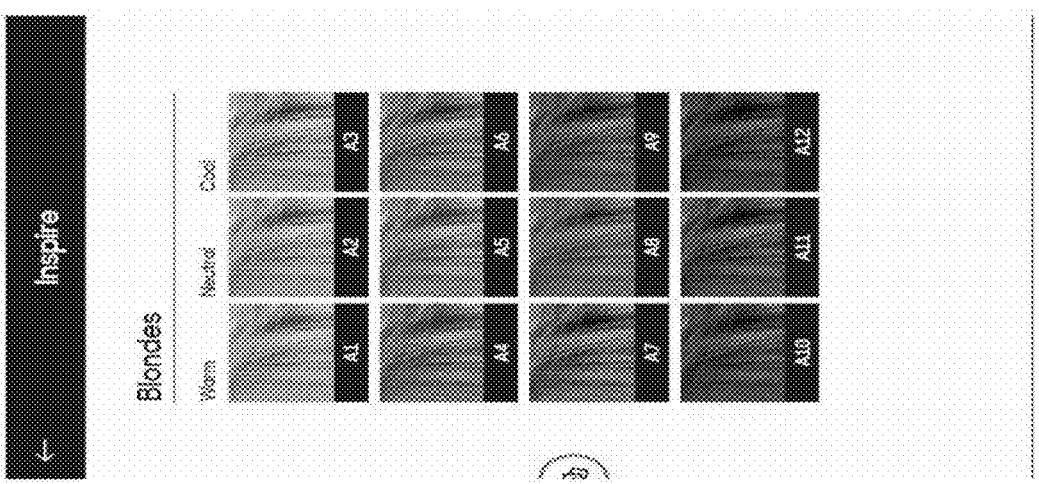
Fig. 21

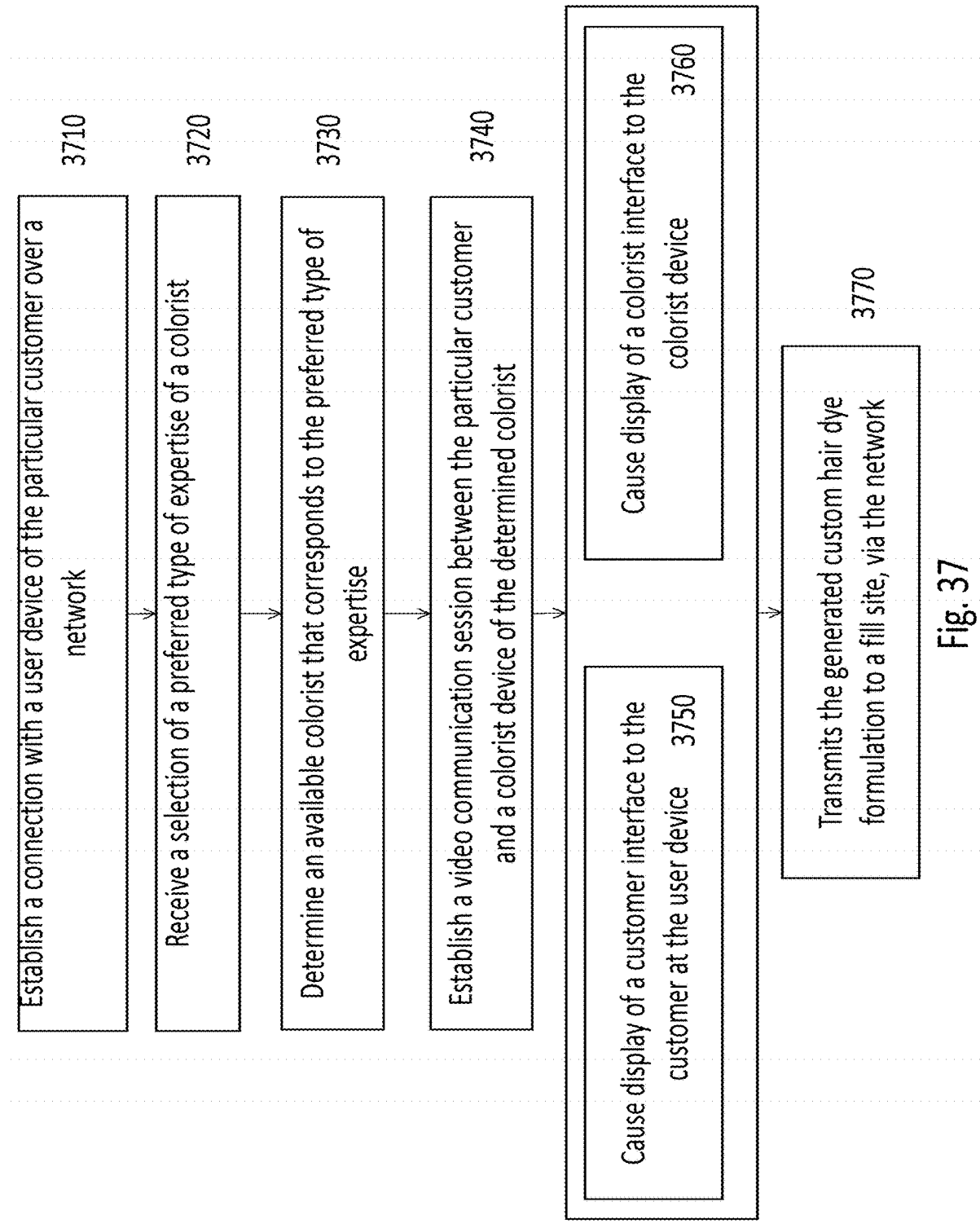

SYSTEM FOR GENERATING A CUSTOM HAIR DYE FORMULATION

CROSS-REFERENCE TO RELATED APPLICATIONS

This application claims the benefit of priority from U.S. Provisional Application No. 62/812,887, filed on Mar. 1, 2019, the entire contents of which are hereby incorporated by reference.

BACKGROUND

A conventional hair dye kit includes a combination of a dye and a developer, each of which may be packaged into a bottle for commercial sale. In the conventional art, a color formulation to be dispensed into dye bottle comes from a source factory, and more specifically from a large volume container.

There is a need to provide a larger variety of color formulations, and even customizable color formulations, to make available for customer purchase. However, the conventional system has a problem in that it is difficult to efficiently predict and make available such a large variety of hair dye formulations for dispensing into hair dye bottle with the existing system in which hair dye formulations are produced and dispensed using large volume containers.

SUMMARY

In an embodiment, a system is provided for generating a custom hair dye formulation to be dispensed into a single customer container for a particular customer, comprising: processing circuitry configured to establish a connection with a user device of the particular customer over a network, receive a selection of a preferred type of expertise of a colorist, determine an available colorist that corresponds to the preferred type of expertise, establish a video communication session between the particular customer and a colorist device of the determined colorist, cause display of a customer interface to the customer at the user device which is configured to display options for specifying a target type of hair color, cause display of a colorist interface to the colorist device which is configured to display options, different from the display options at the user device, for inputting information about the particular customer and the target type of hair color, and for inputting information used to generating the custom hair dye formulation, and transmit the generated custom hair dye formulation to a fill site, via the network, wherein the fill site is caused to dispense one or more of a plurality of bulk hair dye colors into the single customer container based on the generated custom hair dye formulation.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

A more complete appreciation of the disclosure and many of the attendant advantages and features thereof can be readily obtained and understood from the following detailed description with reference to the accompanying drawings, wherein:

FIG. 4 shows an overview of the fill line and personalization process according to an embodiment.

FIG. 5 shows an overview and statistics of a personalized fill line according to an embodiment.

FIGS. 6A-6E show a walkthrough of different aspects of the fill line according to an embodiment.

FIGS. 8A and 8B show a bulk container strategy according to an embodiment.

FIGS. 11A and 11B show details of the "bag-in-box" type of IBC according to an embodiment.

FIG. 12 shows details of the heavy use IBC according to an embodiment.

FIGS. 16-34 show examples of features provided the application used by the customer and the color consultant in an embodiment.

FIG. 37 shows a process performed between a server, a customer, a colorist, and a fill site according to an embodiment.

DESCRIPTION

Figure 1:
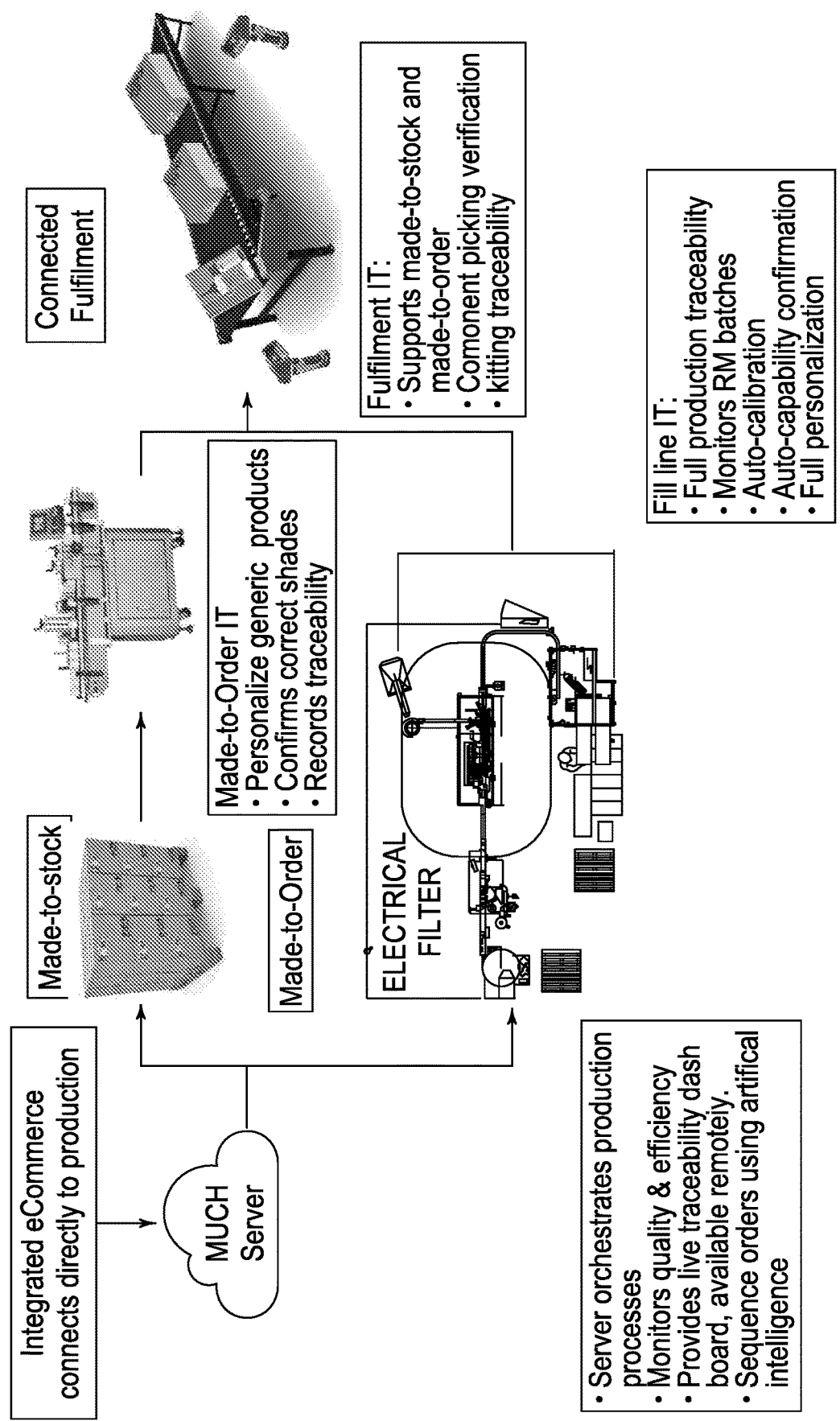
FIG. 1 shows a connection production system according to an embodiment.

The present system and embodiments makes use of existing "bag in box" components—a soft sided, disposable bag with a bonded fitment that is designed for a "quick connect" interaction with a probe+hose assembly. We use these components in a novel manner to house multiple compounds in close proximity in the explosion proof confines of our fill machine. The bag size is optimized to be large enough to not need refill on the line often, but small enough that the weight of fluid inside can be easily and ergonomically lifted/carried by an operator without mechanical assistance for very quick swapping to reduce machine downtime. The bags are couples with dispensing pumps and do not provide any pressure differential as fluid is extracted because the soft sides of the bag simply collapse. The bags are in corrugate boxes that are cost effective and easily collapsible. On the corrugate boxes are labels with 2D barcodes that encode important data about what is inside each. When a new compound is loaded onto the fill line by the operator, the box is scanned and then a 2D barcode on the end of a corresponding hose is scanned and electronic feedback is given to alert the operator that the right hose is connected to the correct compound (or not if incorrect). This ensures that the correct compounds are being dispensed when they are intended to be.

Most of the materials are loaded into the machine in this "bag in box" configuration (~10 L capacity) but other materials may be coupled to the machine with larger Intermediate Bulk container means plus an intermediate tank. In this case, compounds would be pumped from the large scale containers to an intermediate holding tank which is small enough to not apply too much pressure from gravity on the dispensing pumps.

The fill line described herein uses a linear fill format (empty bottles enter, bottles labeled with serialized 2D barcode labels that can be scanned with a 2D barcode reader. Once bottles reach fill portion of machine, they are scanned and then filled with multiple compounds (5-9 compounds selected from a possible 20-27) per the information corresponding to the serial number per an order database. As each bottle is filled with different compounds, it is not practical to open up every single bottle and do a detailed chemical analysis test or functional test to ensure the compounds and their individual fill quantities are correct. Instead, this system relies on multiple fill position (between 5-7) with multiple nozzles (between 1-6) affixed at each fill position. Each nozzle corresponds to one compound. The compounds are "dosed" in each bottle to makeup a final formula. Bottles are advanced in sequence from one fill position to the next by "walking" type conveyor. In each fill position is a lab quality load cell (readout in the range of 0.1 mg) that are mechanically isolated from vibration. Combined weights can be measured at each fill position.

The fill machine can function in two ways: 1) Production Mode—which is optimized for dispensing speed and 2) Calibration Mode—used periodically to ensure process capability of dispensing nozzles. In Production mode, compounds are dispensed from multiple nozzles all at once and the load cells are used to verify that the expected combined dispense mass (based on the "Recipe" in the order database) is within tolerance. If within tolerance, the bottle continues down the line to the next station. If out of tolerance, the bottle serial number is automatically/electronically marked as reject. In the Calibration Mode, each dispensing nozzle is fired one by one multiple times, and the weight of each individual dispense is checked by the load cell and electronically recorded. If the distribution of dispenses represent a high Cpk (process capability) value, the machine is considered qualified and is approved for production until the next scheduled Calibration check period.

In an embodiment, sequence orders of the bottles may be configured using artificial intelligence to enhance efficiency. For instance, sequencing may be performed dynamically based on predicted fill times of each of a plurality of bottles based on the respective formulas for each bottle.

Moreover, the system described herein produces personalized cosmetic products on demand in a factory. The machine is comprised of several different stations linked together by collaborative robots. The system is self organizing, and the stations figure out on their own what they need to do in order to produce the products. The system can produce several SKUs concurrently at no efficiency loss. The same system can be used for many Additional details are described below and in the accompanying figures.

FIG. 1 depicts a connection production system for integrating eCommerce directly to production, so that personalized products can be made-to-order at a filling system in order to make individual hair dye kits that are customized for users. As shown in FIG. 1, a server orchestrates production processes, monitors quality & efficiency, provides live traceability dash boards, available remotely, and may sequence orders using artificial intelligence.

FIG. 1 further shows that there may be two paths in the production process: a "made-to-stock" path and a "made-to-order" path. The "made-to-stock" path may produce bottles of stock or generic dye colors which are in high demand. The "made-to-stock" path further personalizes generic products; confirm correct shades; and records traceability of an order.

The "made-to-order" path includes a specialized fill station which will be discussed in more detail below. The "made-to-order" path provides full production traceability; monitoring of RM batches; Auto-calibration of the dispensing mechanisms of the fill station; auto-capability confirmation; and full personalization.

Either of the above two paths leads to the connected fulfillment section of the process, where component picking verification is performed as well as ensuring traceability of the dye and developer kits which are produced.

Figure 2:
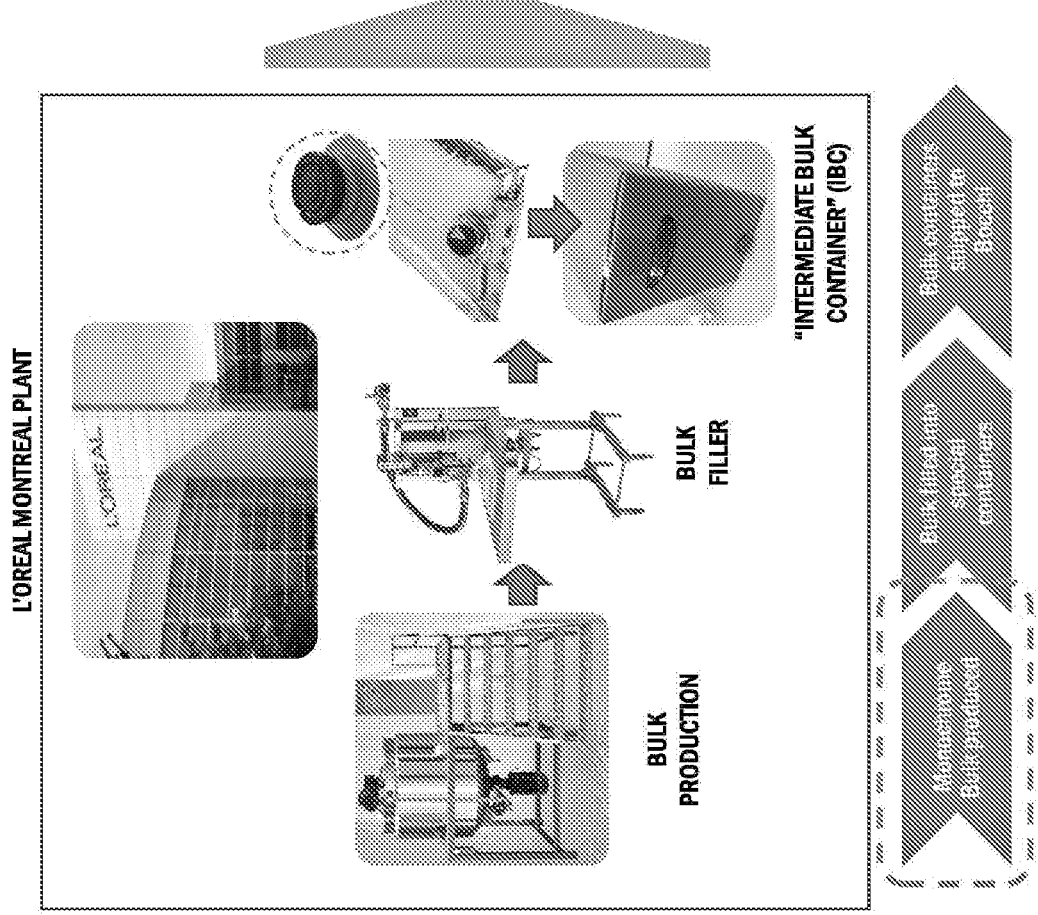
FIG. 2 shows a process of dye fulfillment flow according to an embodiment.

FIG. 2 provides an overview of the dye fulfillment flow, which shows the process from bulk production of the dye monochromes, to bulk filling of the intermediate batch containers, to the fill line, to fulfillment.

Figure 3:
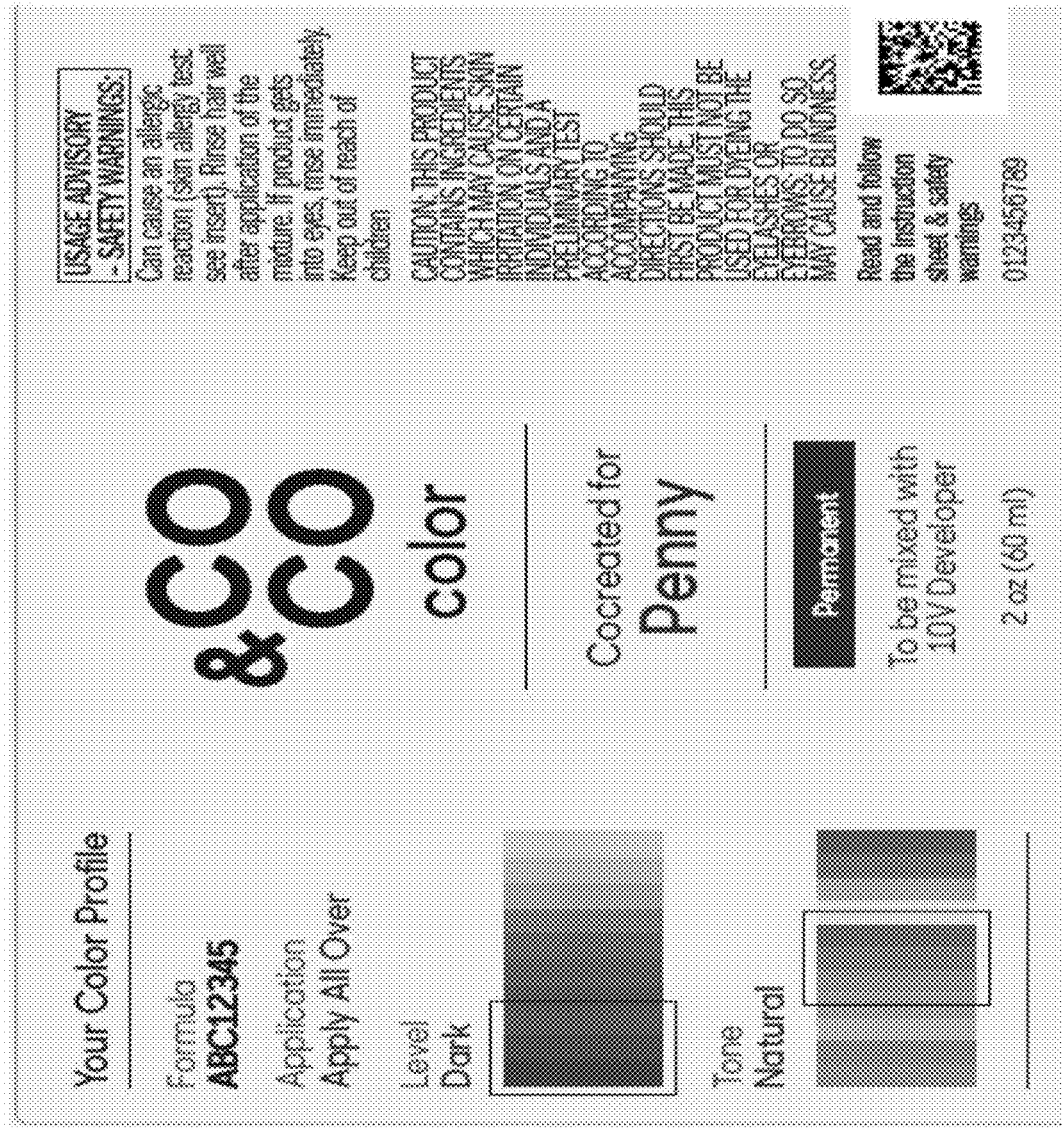
FIG. 3 depicts a label that may be applied to a bottle of a customized dye formulation produced by the system according to an embodiment.

FIG. 3 depicts a label that may be applied to a bottle of a customized dye formulation produced by the system. Among other information, the label specifies the customer name, the formula number, the recommended application, the shade level, and the tone.

FIG. 4 shows an overview of the fill line and personalization process according to an embodiment. It can be seed that there are two components involved in this process: a fill line (dispensing occurs) and a fulfillment line (where kits are assembled and personalized labels are produced and applied).

FIG. 5 shows an overview and statistics of a personalized fill line. It can be seen that the personalized fill line described in the present embodiments provides:

Fastest personalized manufacturing to date (10 units per minute). 1.5M units/year assuming 2*8 hours shifts
100% traceability and full unit serialization
In-line quality checks
Highly automated (<1 Full Time Operator required)
Highly adaptable to allow for new dye colors in future
Directly linked to kitting line
Internet connected per Industry 4.0 standards Additionally, the capacity of production of the fill line will increase heavily in the coming years with just 1 or 2 machines being needed.

FIGS. 6A-6E show a walkthrough of different aspects of the fill line.

FIG. 6A shows that an internet connected labeler prints custom info per order, and the labels can be applied at the egress of a bottle feeder.

FIG. 6B shows that a vision system can be used to scan the label after it is applied to ensure accuracy and enhance quality control.

Figure 6C:
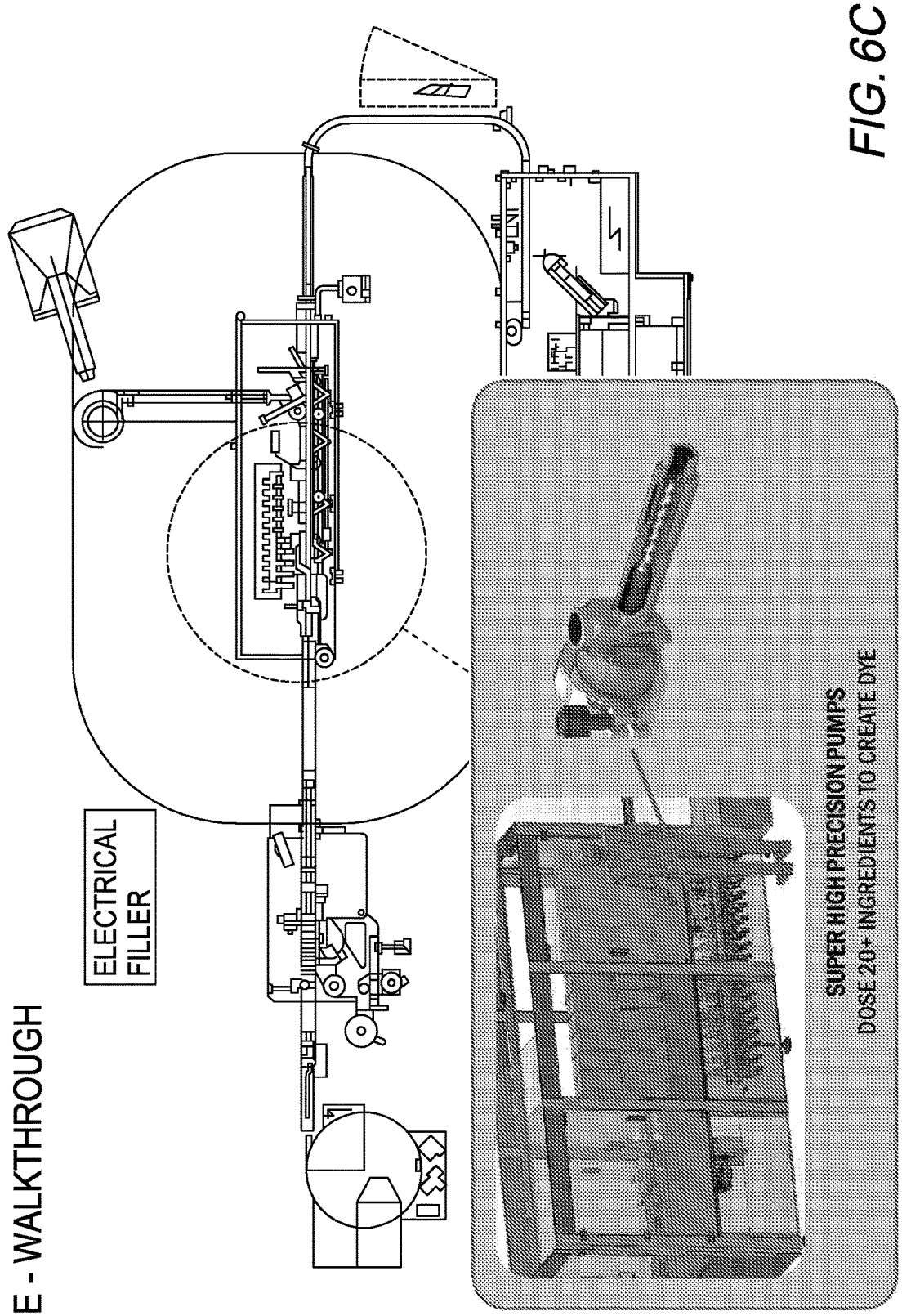

FIG. 6C shows that super high precision pumps can be used to dose a large quantity of ingredients from the corrugated containers to create a custom dye formulation.

FIG. 6D shows that precision scales can be used for in-line quality control and automated pump calibration.

Figure 6E:
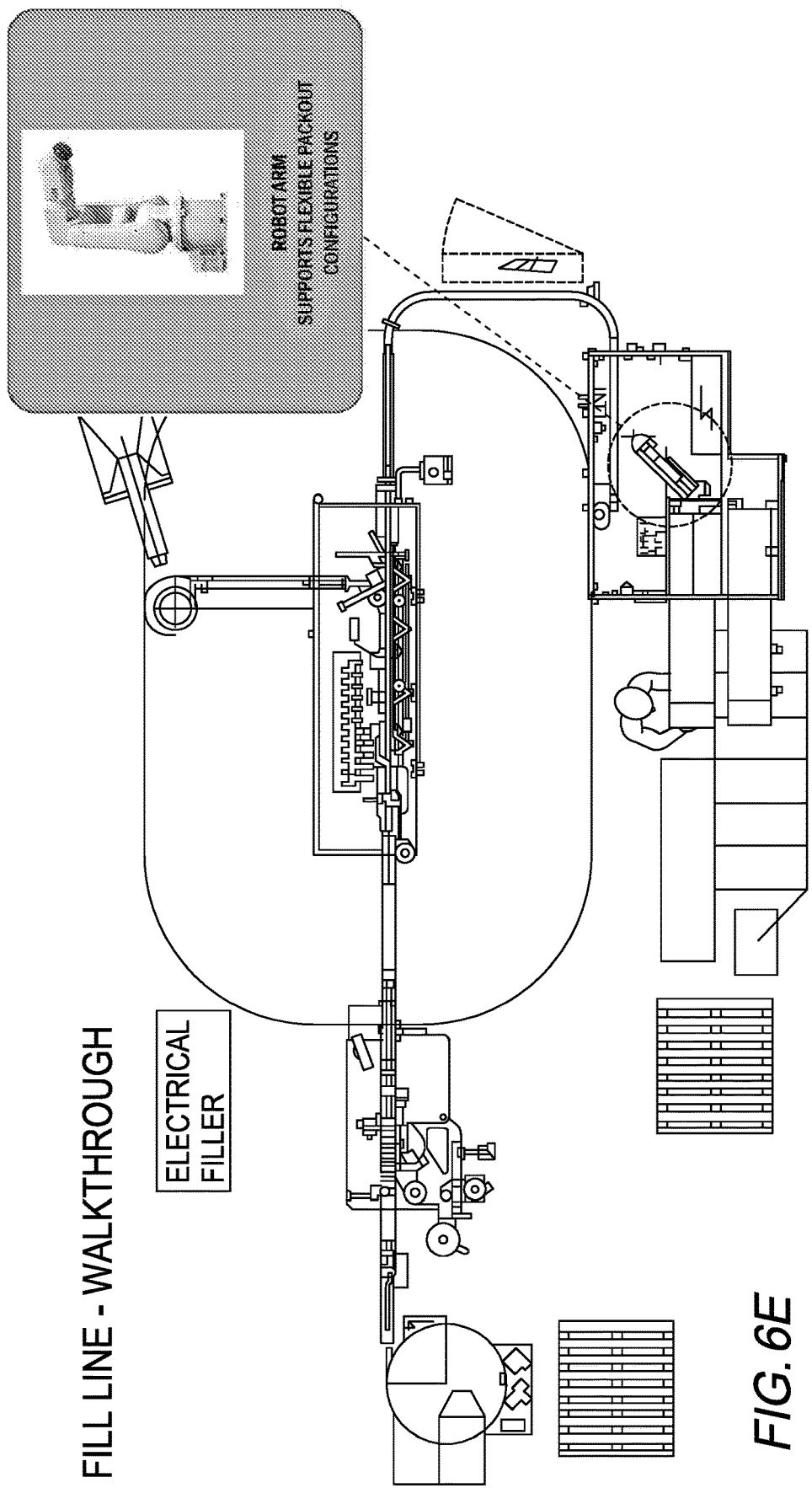

FIG. 6E shows that a robot arm may be used at fulfillment to support flexible packout configurations.

Figure 7:
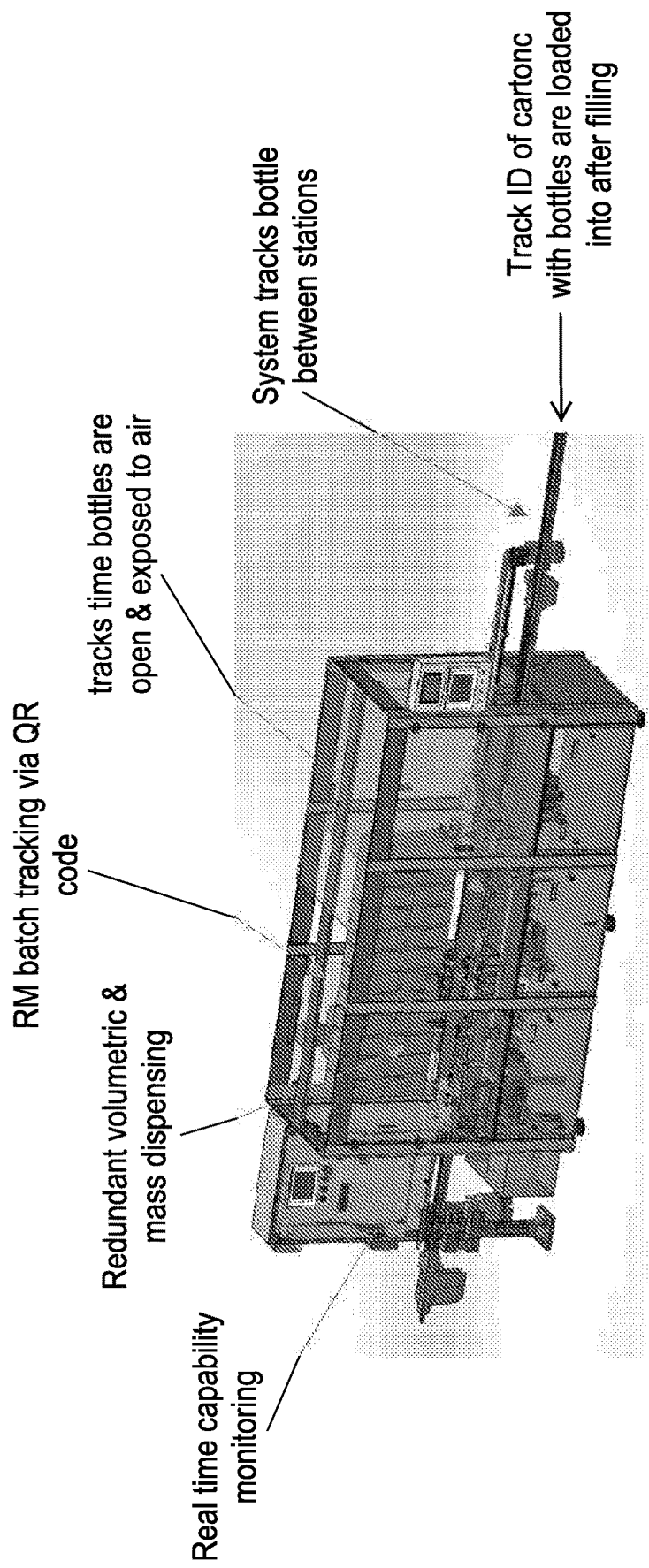
FIG. 7 shows an over view of the fill station technology according to an embodiment.

FIG. 7 shows an over view of the fill station technology. The fill line and dispensing station applies several simultaneous functions, such as real time capability and monitoring, redundant volumetric & mass dispensing, RM batch tracking via QR codes, the ability to track the amount of time bottles are open and exposed to air, tracking bottles between stations, and tracking the identification of cartons which bottles are loaded into after filling.

Figure 8A:
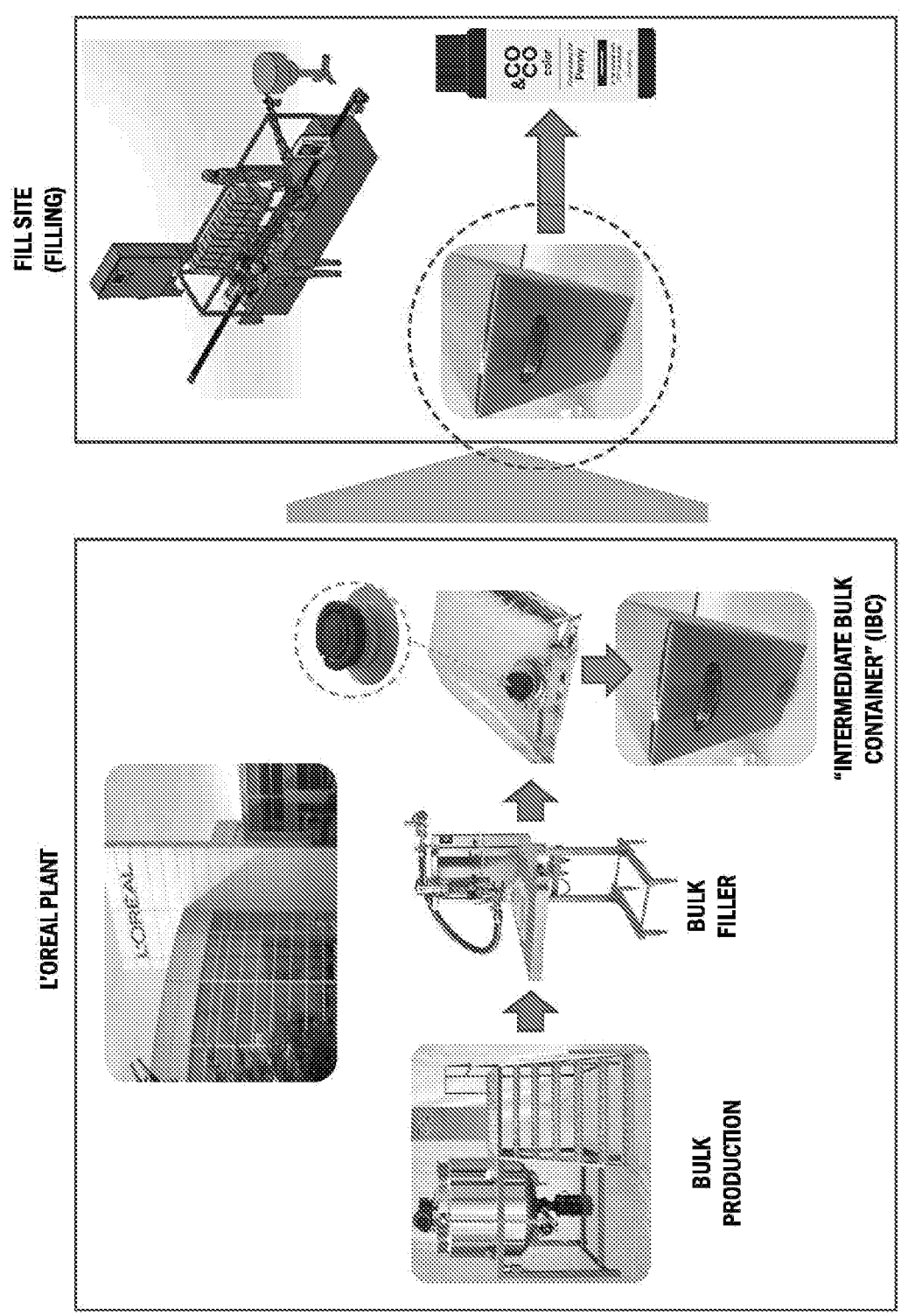

FIGS. 8A and 8B show a bulk container strategy which can be used to provide a size of bulk hair dye volume that is compatible with the needs of the fill station. The strategy involves filling intermediate bulk containers (IBCs) at a plant where a combination of bulk hair dye production and a specialized bulk filler can be used to fill a "bag" like container with hair dye, and then a box container can be used to hold the bag for safe storage. The bag may be collapsed into the box and the bags may be sized according to a usage rate.

This bulk container strategy provides the following features.

Figure 9:
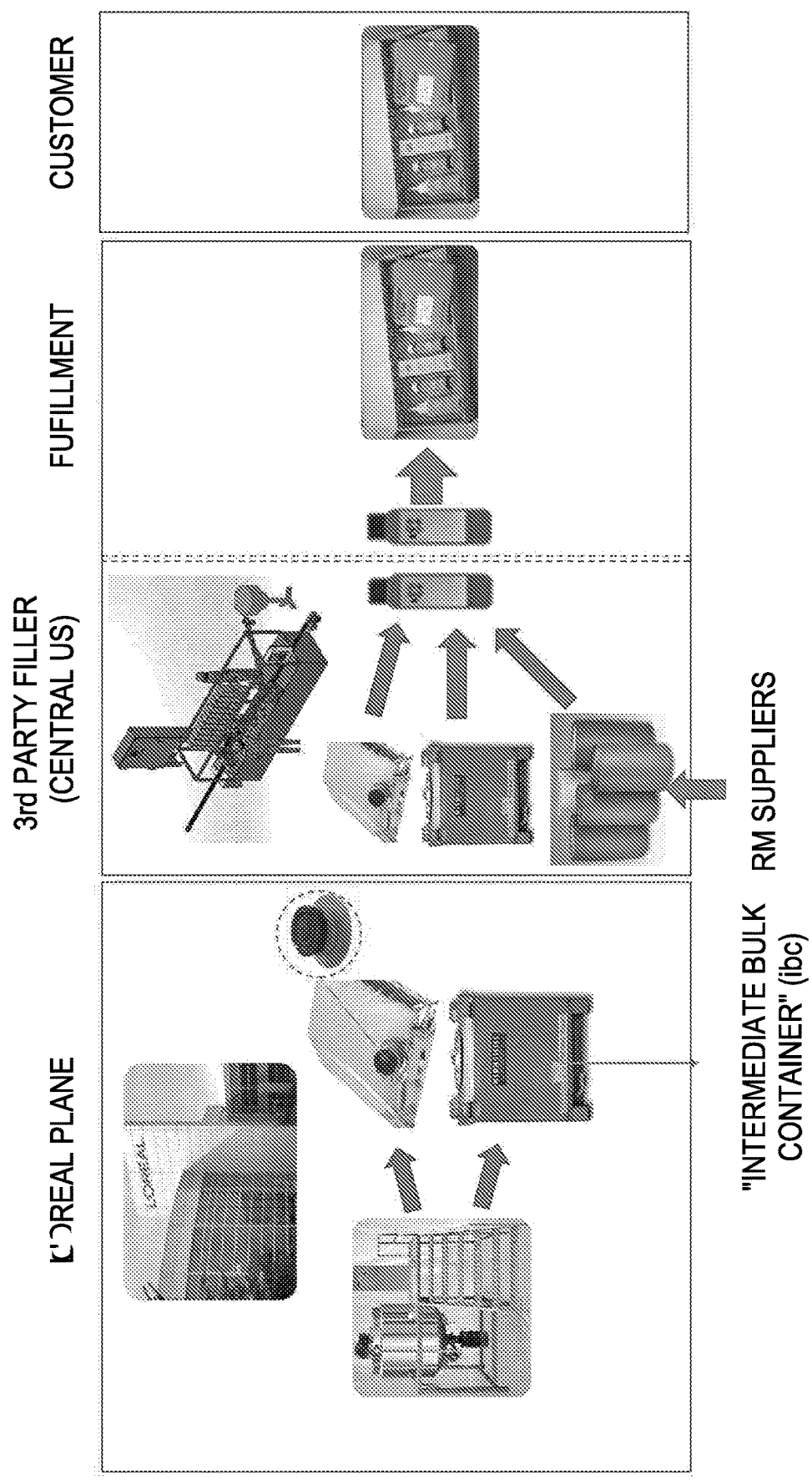
FIG. 9 shows more details related to the bulk container strategy according to an embodiment.

Rated to contain XP (explosive) material
Approved for international shipping and easy to palletize
Provide for quick swapping capability to reduce fill line downtime
Easily disposable/recyclable
Optimally sized for compound usage rates while remaining ergonomic for operators
Chemical compatibility with 17+ compounds in long term storage
Light blocking
Completely airtight to prevent oxidation
Reasonably priced to not affect FG piece price
Long term availability from trusted supplier FIG. 9 shows more details related to the bulk container strategy. It can be seen that hair dye bottles can be filled not just by the boxed IBCs utilized at a fill station at third party site, but they can also be filled based on larger containers provided by RM suppliers, which may supply the developer to the third party site.

Figure 10:
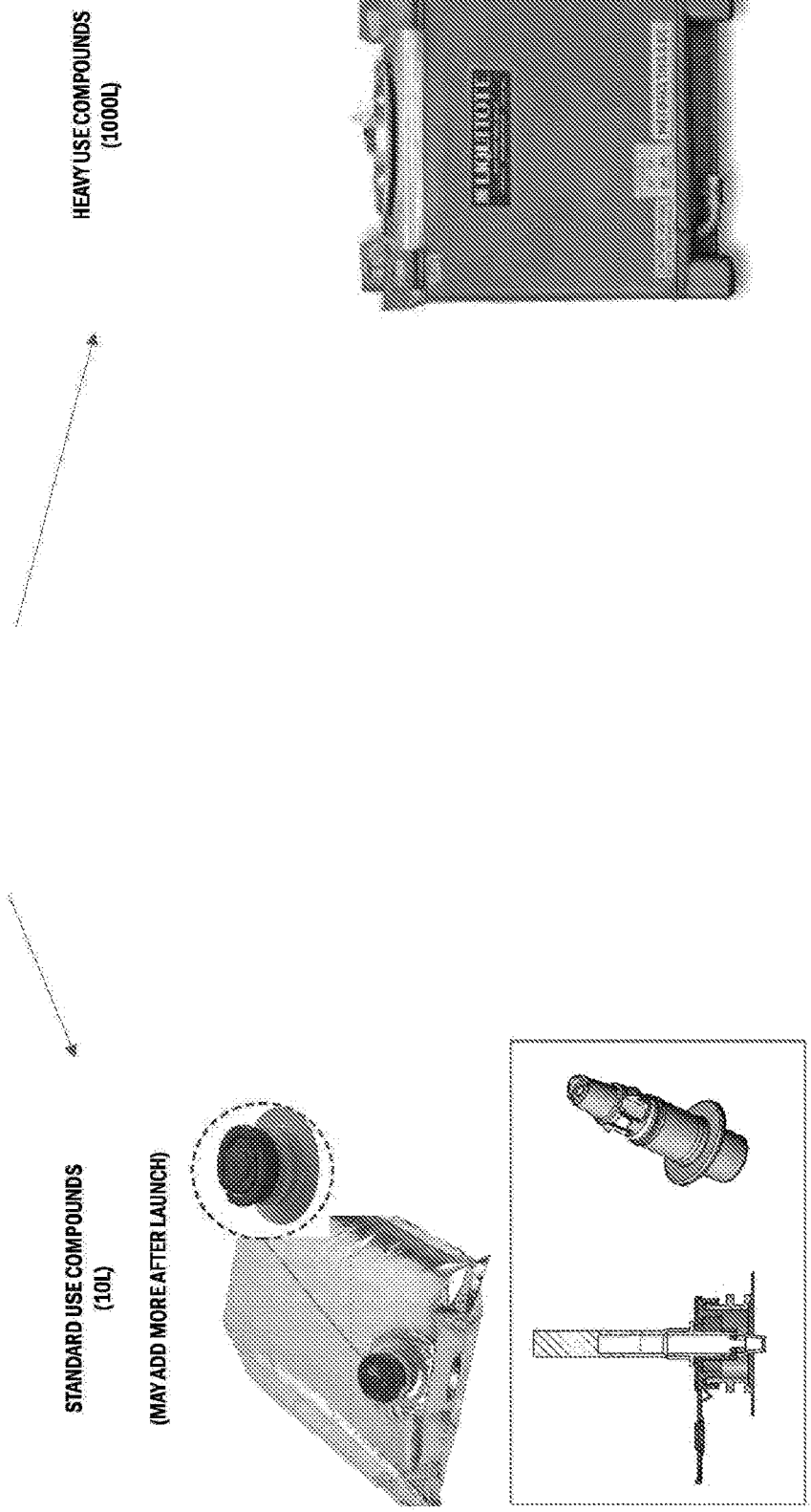
FIG. 10 shows that there are two types of intermediate bulk containers (IBCs) in an embodiment.

FIG. 10 shows that there are two types of intermediate bulk containers (IBCs). The first type is described above as the "bag"-type container that stores standard use compounds and can be accessed using a special valve and probe to form an airtight seal as shown in FIG. 10. The second type is a larger sized hardened container that holds heavy use compounds.

FIGS. 11A and 11B show details of the "bag-in-box" type of IBC and FIG. 12 shows details of the heavy use IBC.

Figure 13:
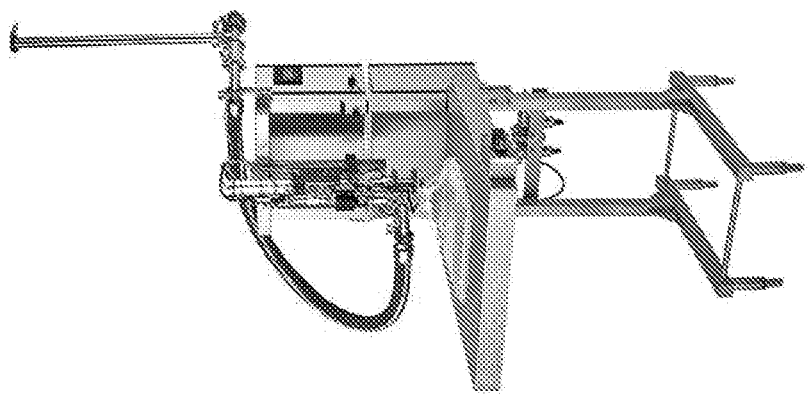
FIG. 13 shows the IBC filling equipment used during production in an embodiment.

FIG. 13 shows the IBC filling equipment used during production. The fill device shown in FIG. 13 may be for example, a Scholle IPN TrueFill 900, and all literature.

Figure 14:
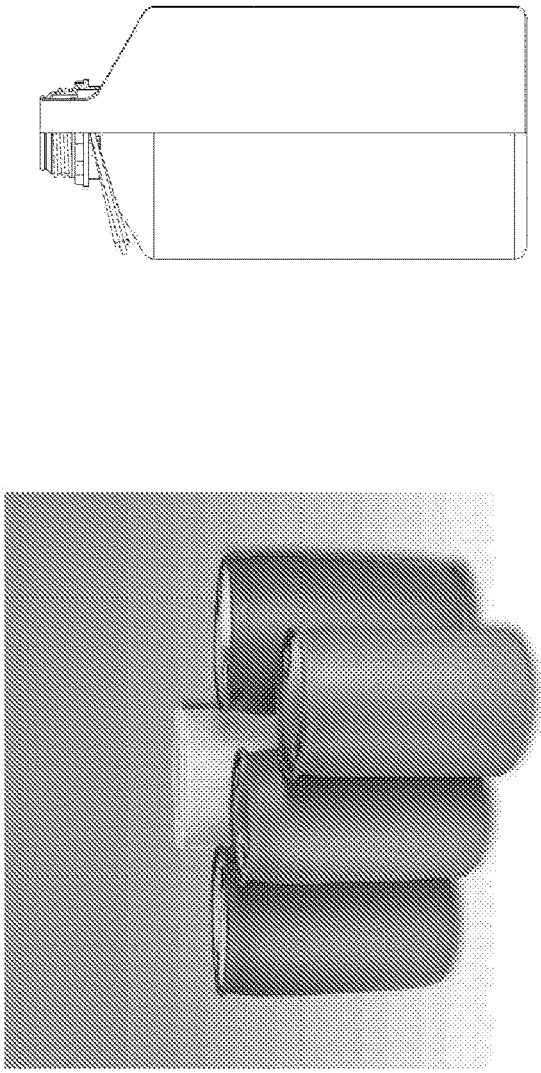
FIG. 14 shows details related to the containers in an embodiment

FIG. 14 shows details related to the containers used for direct RM ingredients such as ammonia.

Figure 15:
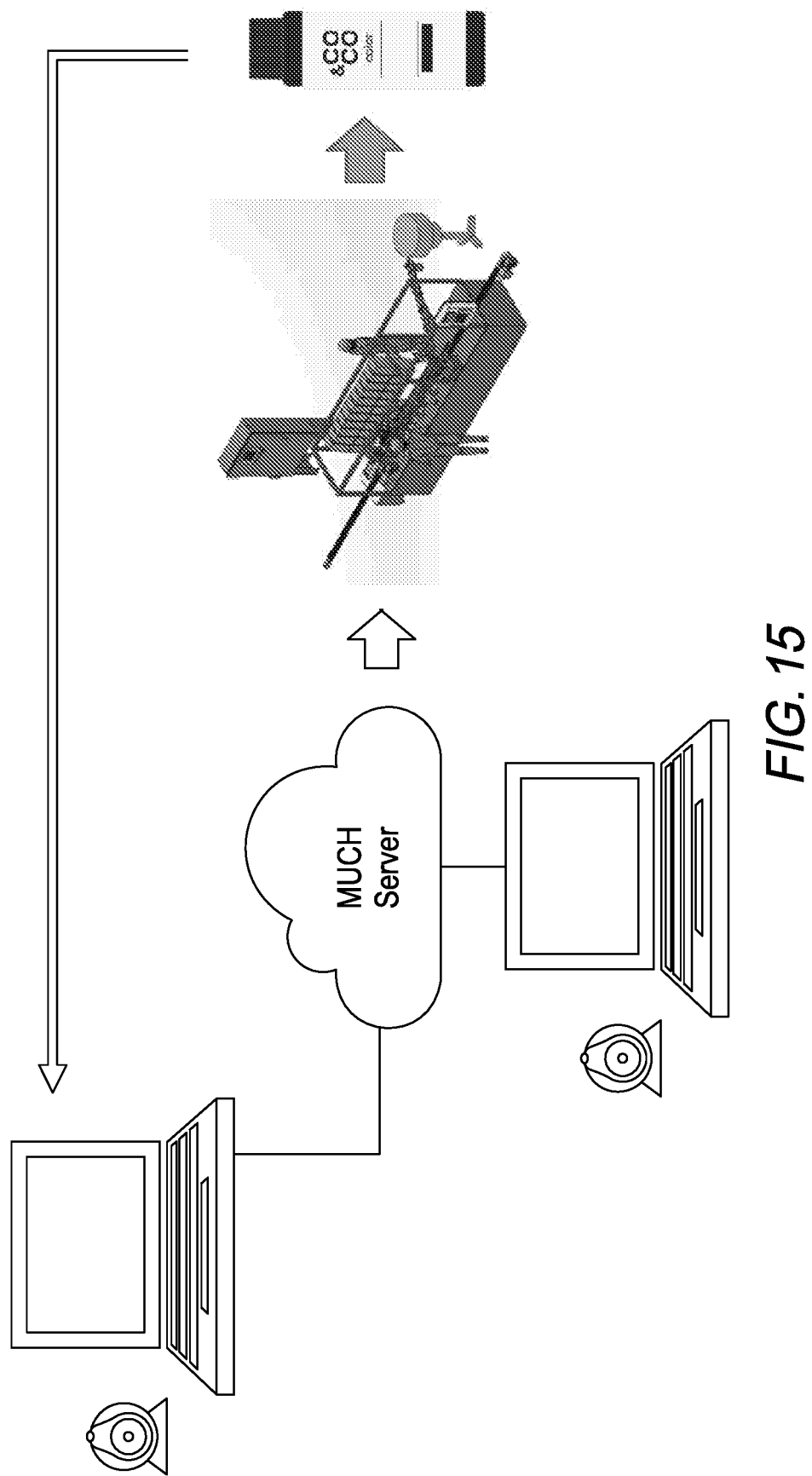
FIG. 15 shows an overview of a process and system to receive an order of a personalized dye according to an embodiment.

FIG. 15 shows an overview of a process and system to receive an order of a personalized dye 1560 according to an embodiment. The system includes a customer site device 1510, a color consultant site device 1520, and the fill site 1550 described above. A server 1530 or any combination of devices (such as a cloud network) may be connected to each of the customer device 1510, the color consultant 1520, and the fill line site 1550. A controller device 1540 may control the functionality performed at the fill line site 1550.

In the system of FIG. 15, an application is provided which is configured to allow a customer to input user information in order to generate a prescribed formula which is used to dispense a custom color. The application may be installed on a server site and be accessed by a user via a web browser or an application ("app") for example. Additionally, the application, or a different application which is also installed on the server site may be accessed by a color consultant via a web browser or an application.

In an embodiment, the customer may be presented with two options: (1) speak with a color consultant, or (2) take a color quiz or questionnaire. In option (2), the customer may answer a series of questions about their hair and hair goals, and based on the answers, a recommended hair color product will be generated automatically and provided to the user. However, during the quiz the customer will always have the option to exit and choose option (1). Additionally, based on the answers to the quiz, such as previous use of a non-dye color treatment, the user may be required to speak to a color consultant.

The application for the customer and the application for the color consultant is configured to facilitate a video consultation session between the customer and the color consultant.

The operating system of the computer devices used by the customer, the color consultant, any other points in the system can have a user interface that is configured to perform multiple functions. In an aspect, the device can be in communication with a network and enable the user interface access to the Internet as well as Internet of Things (IOT). As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known.

The device can also have a camera function either integrated or external that can be used facilitate the video session.

FIGS. 16-34 show examples of features provided the application used by the customer and the color consultant.

Figure 16:
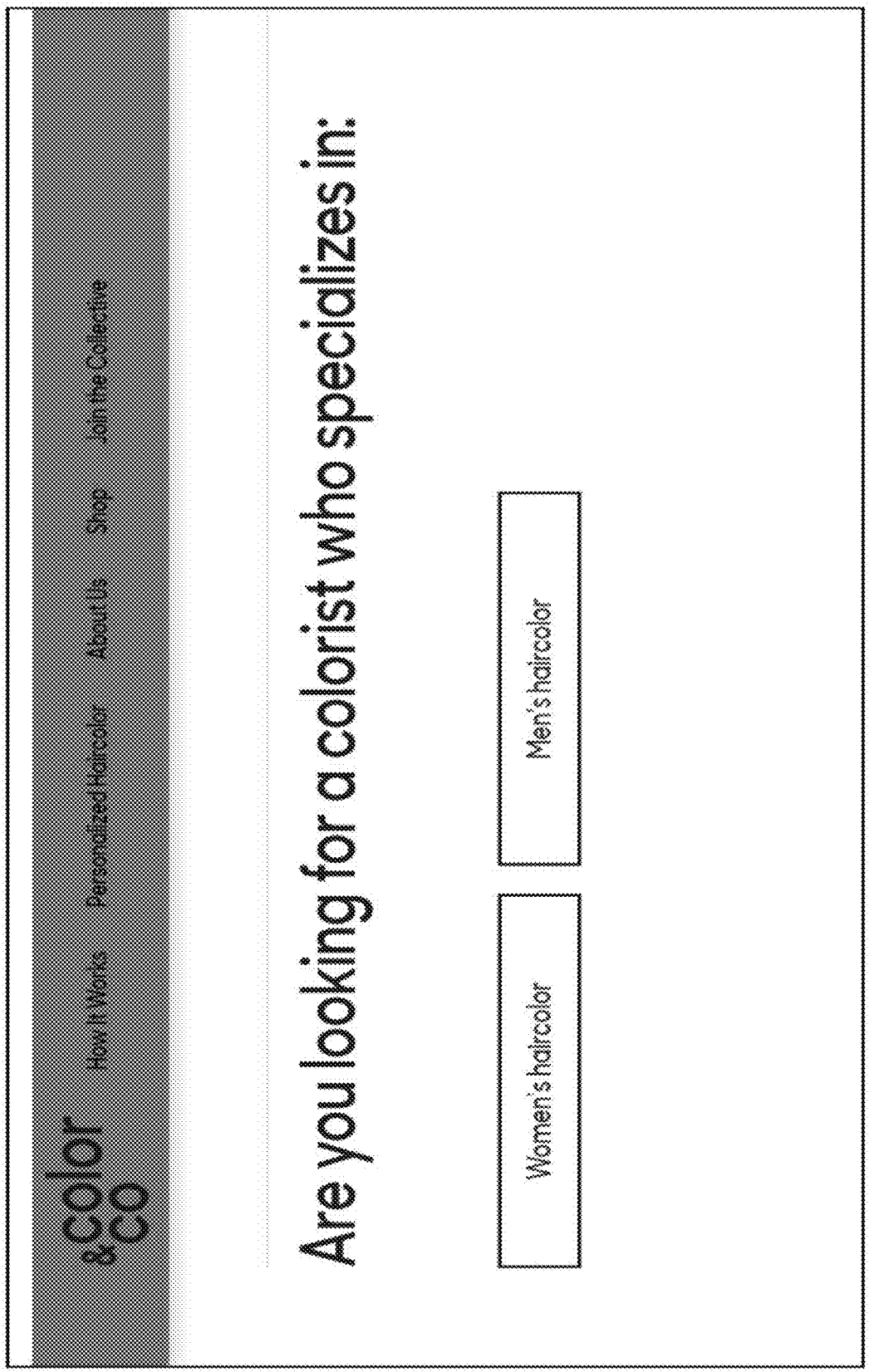
Figure 17:
Figure 18:
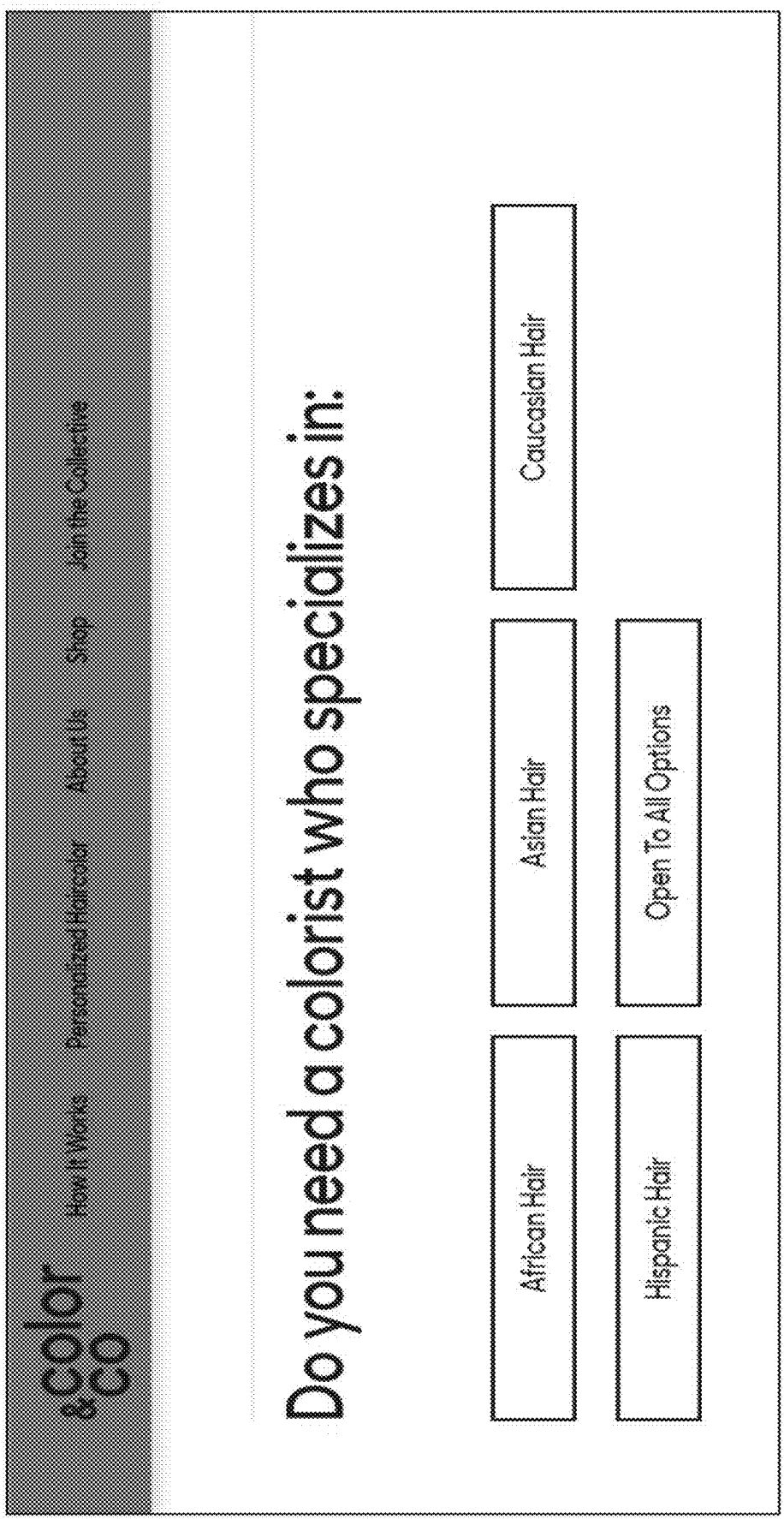
Figure 19:
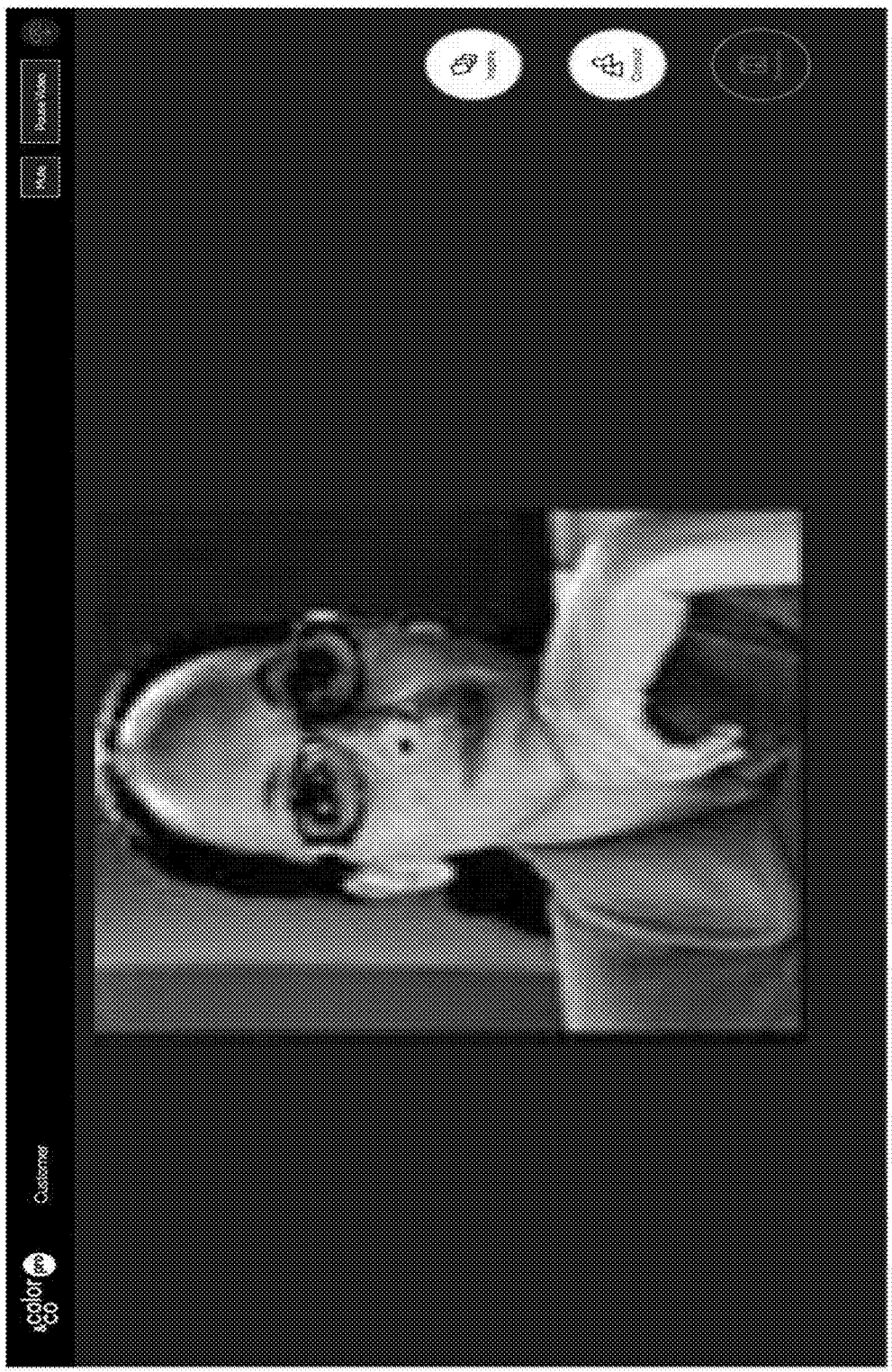

As shown in FIG. 16, a customer may be prompted to input the specific type of expertise they are seeking in a hair colorist. As shown in FIGS. 16-18, the customer may be prompted if they are seeking a colorist who specializes in hair color based on gender, color, or ethnicity. While note shown, a colorist may optionally be selected based on language—such as Spanish or English. As depicted in FIG. 19, based on the user's choices, the system will connect the customer with a colorist to form a video session, where the customer can see the colorist via video and vice versa.

Figure 20:
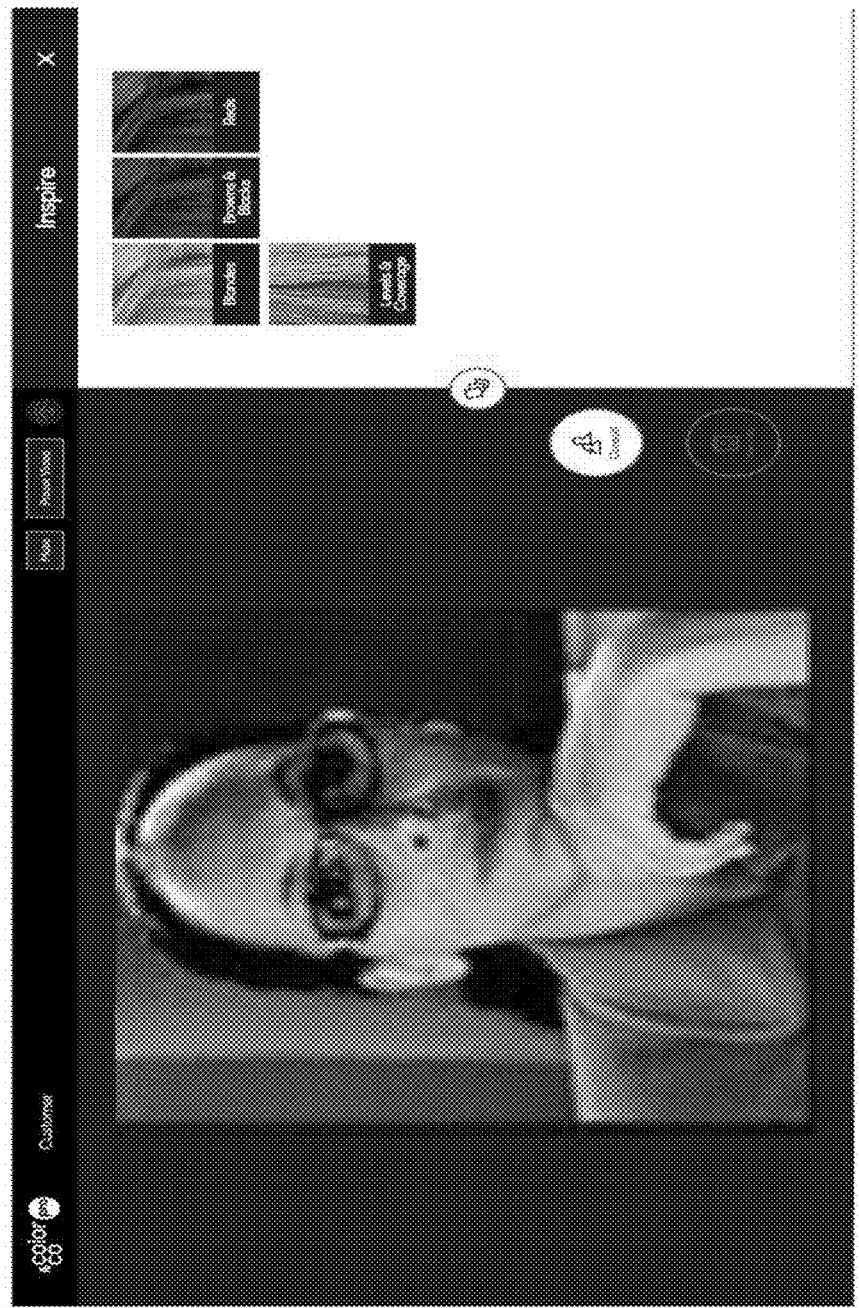

As shown in FIG. 20, the colorist may provide an input to an "inspire" screen which may show different enumerated examples of types of hair color based on different categories, as shown in FIG. 21. The input to the "inspire" screen may be based on a verbal description provided by the customer. While not shown, customers can also upload their own inspirations using image upload and/or social media such as Pinterest, Instagram, Facebook, Twitter, or the like.

Figure 22:
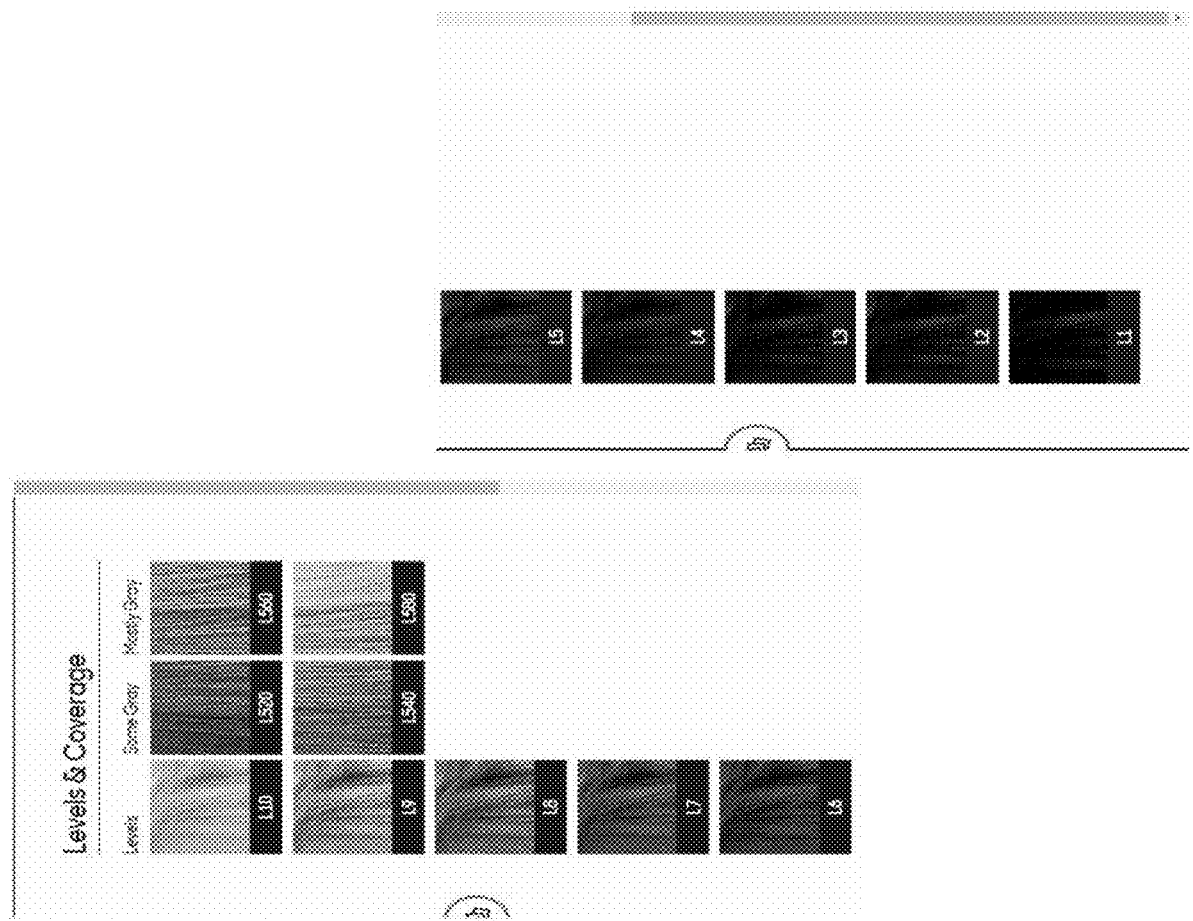

FIG. 22 shows that an input may be provided to further specify a customer's natural level and percentage of gray hair in a sub-menu.

Figure 23:
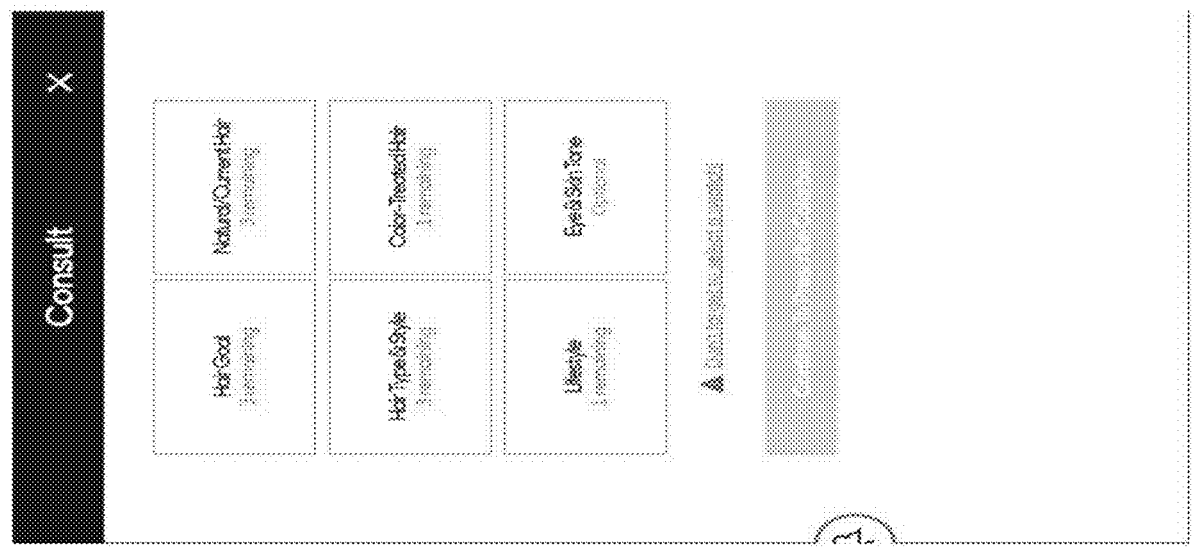
Figure 24:
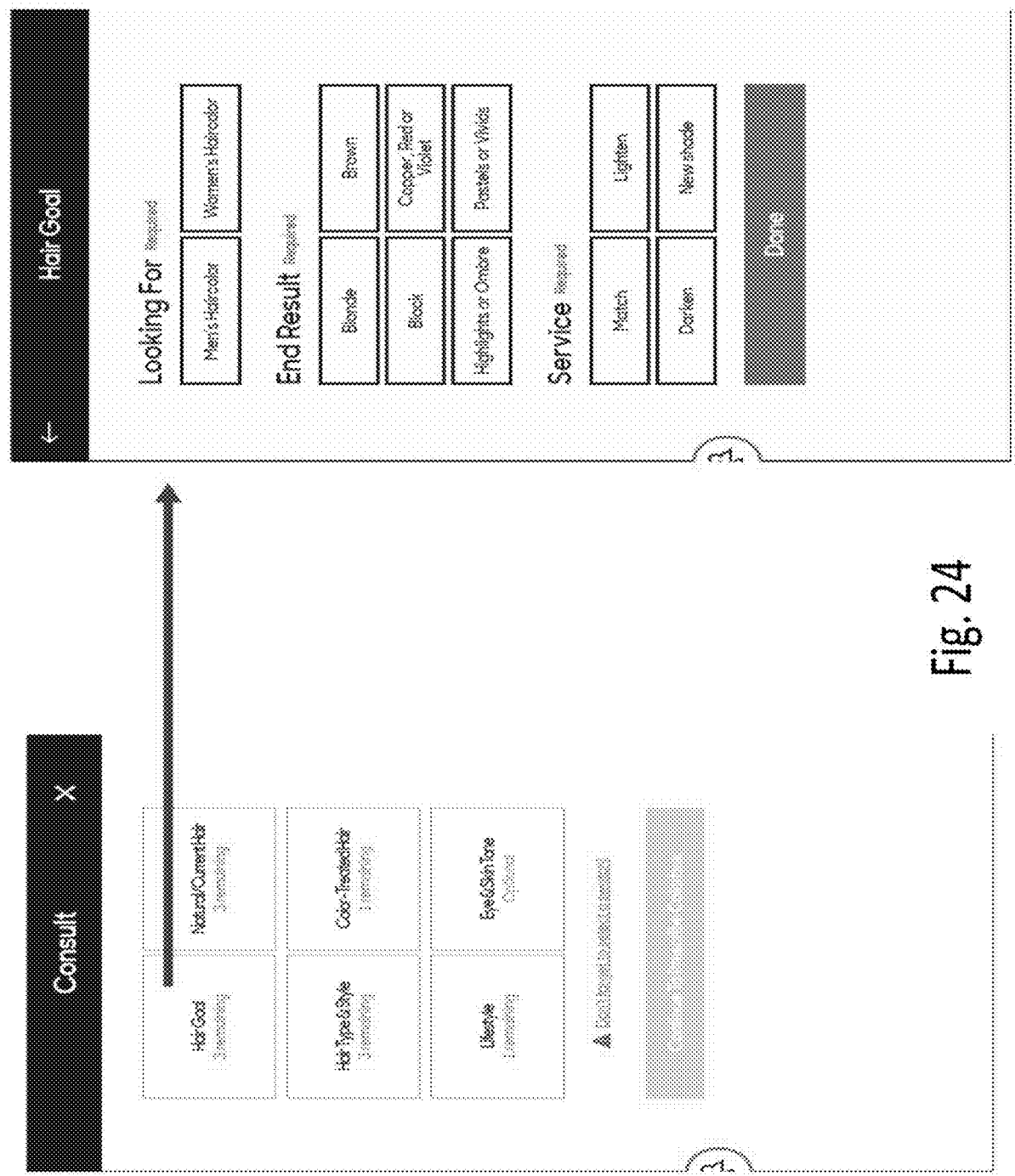

At that point, the colorist may take the user's inputs and perform operations on an application display screen that is shown to the colorist. For instance, as shown in FIG. 23, a colorist may be required to select different options for different categories on a "consult" screen. For example, if the colorist selects "hair goal," then there are three required items which the colorist must input as shown in FIG. 24, such as a specification on gender, end results, and a type of service.

Figure 25:
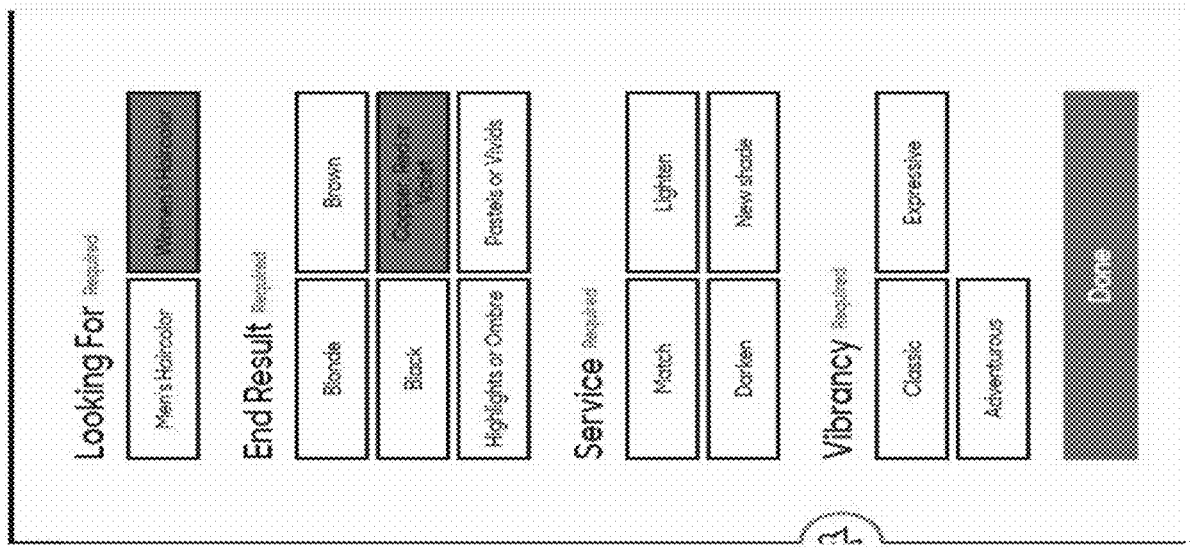
Figure 26:
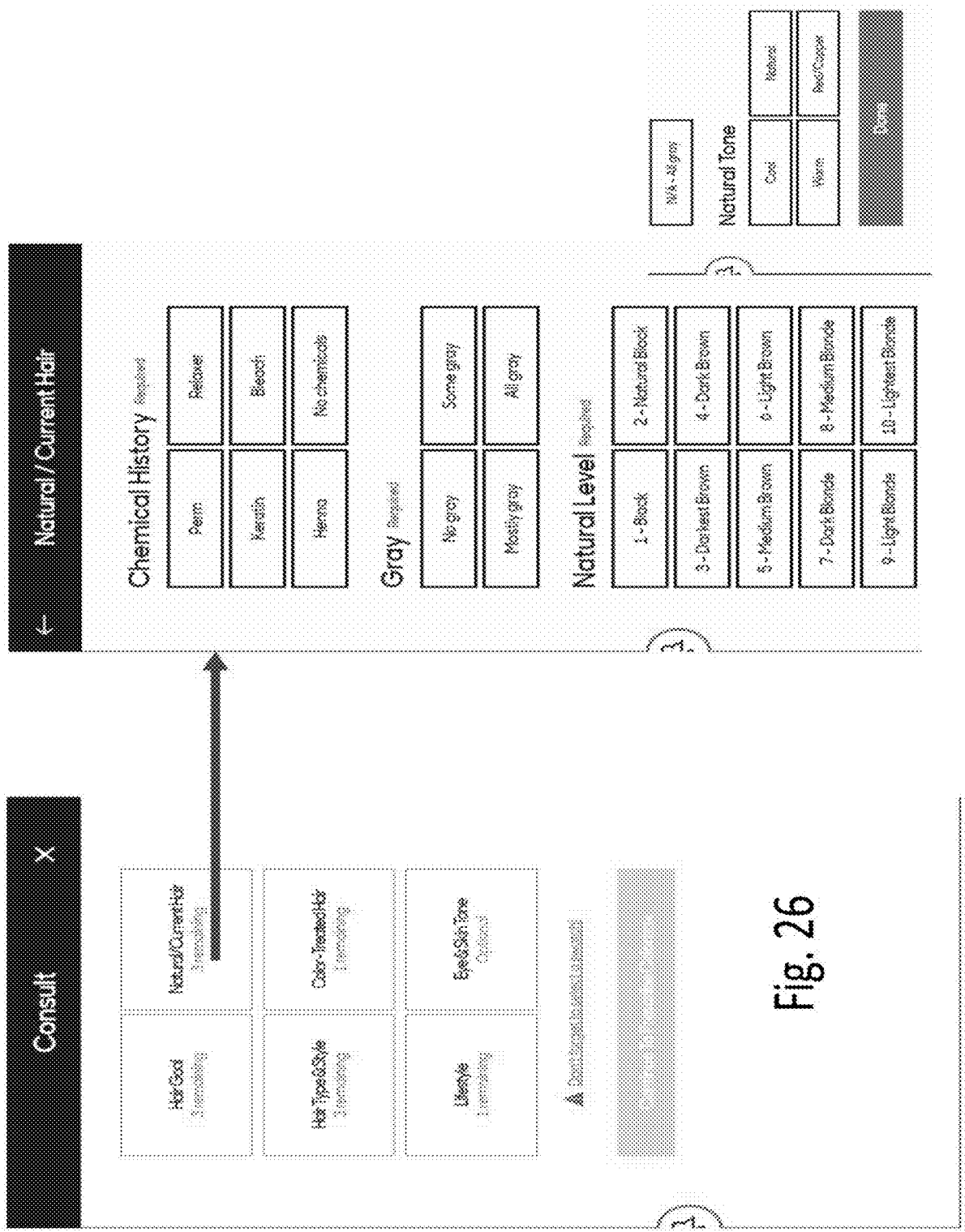
Figure 27:
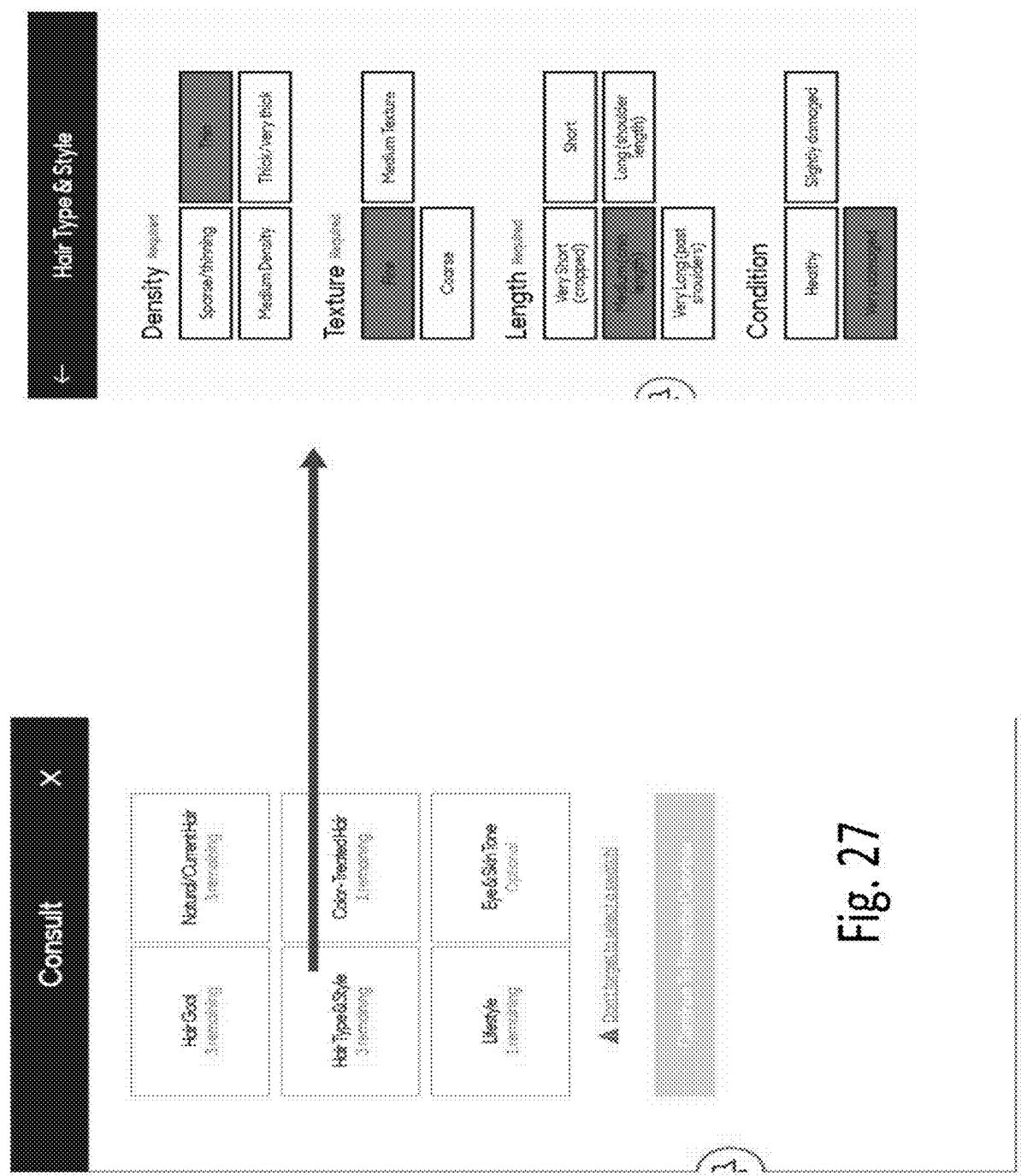
Figure 28:
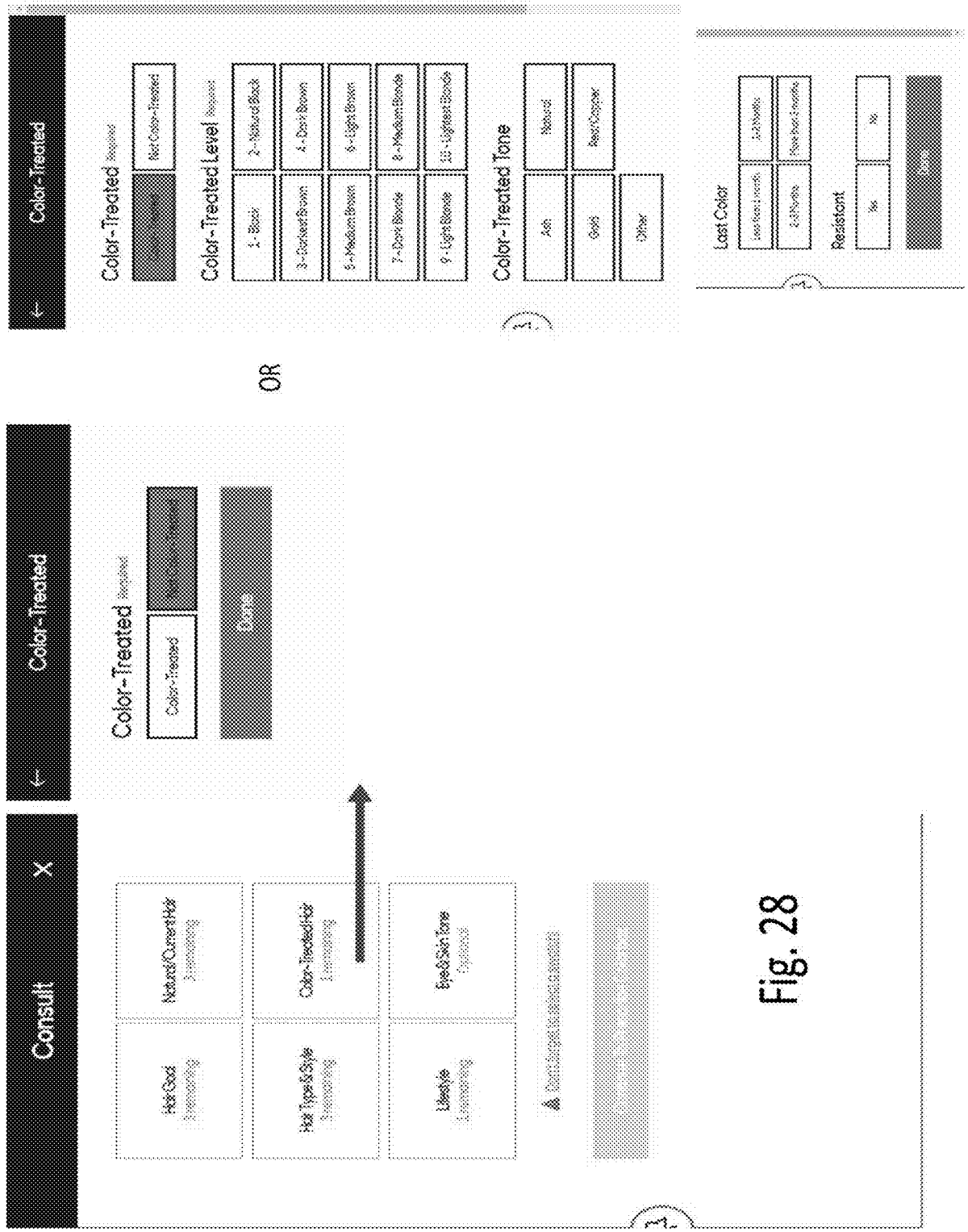
Figure 29:
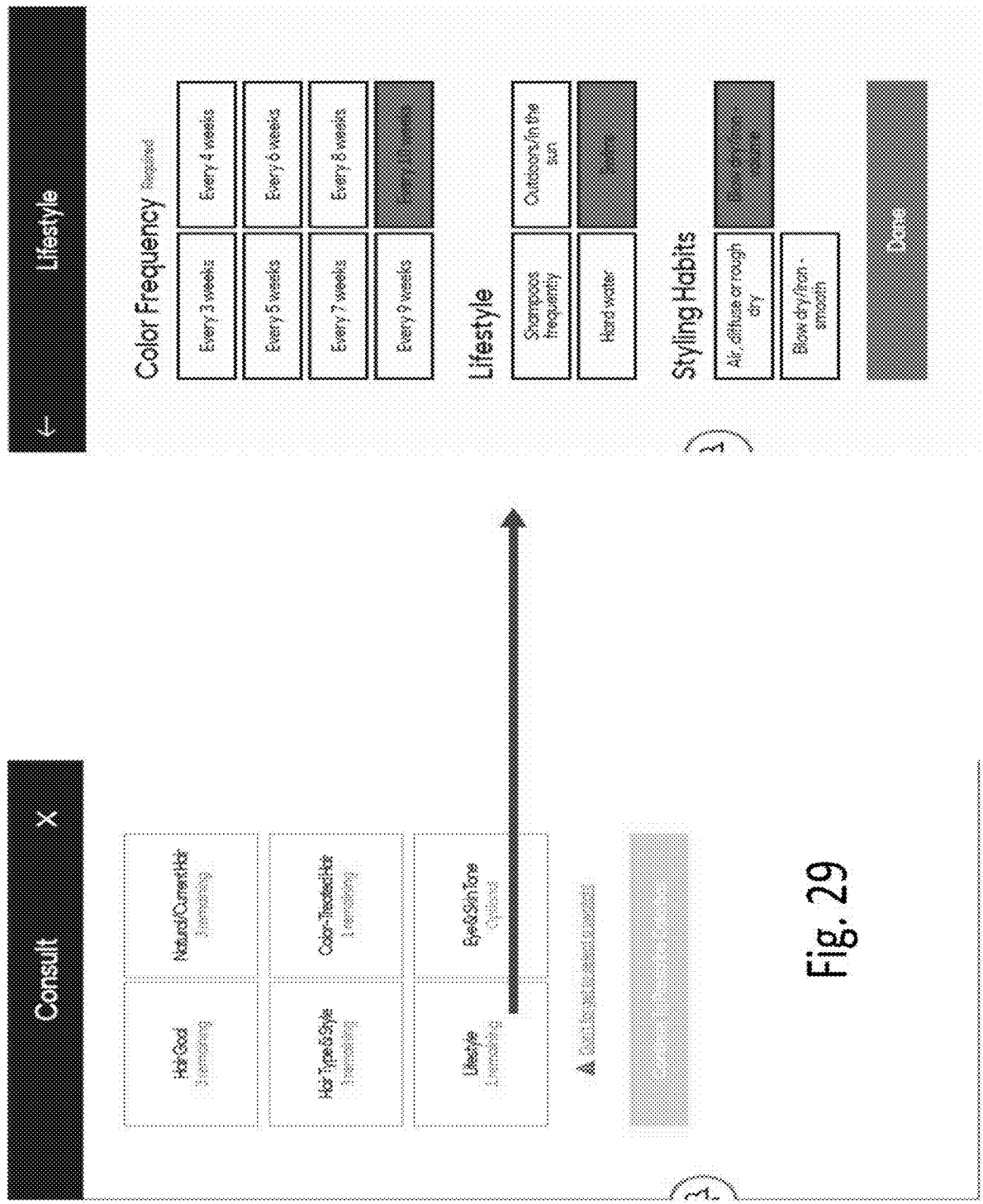
Figure 30:
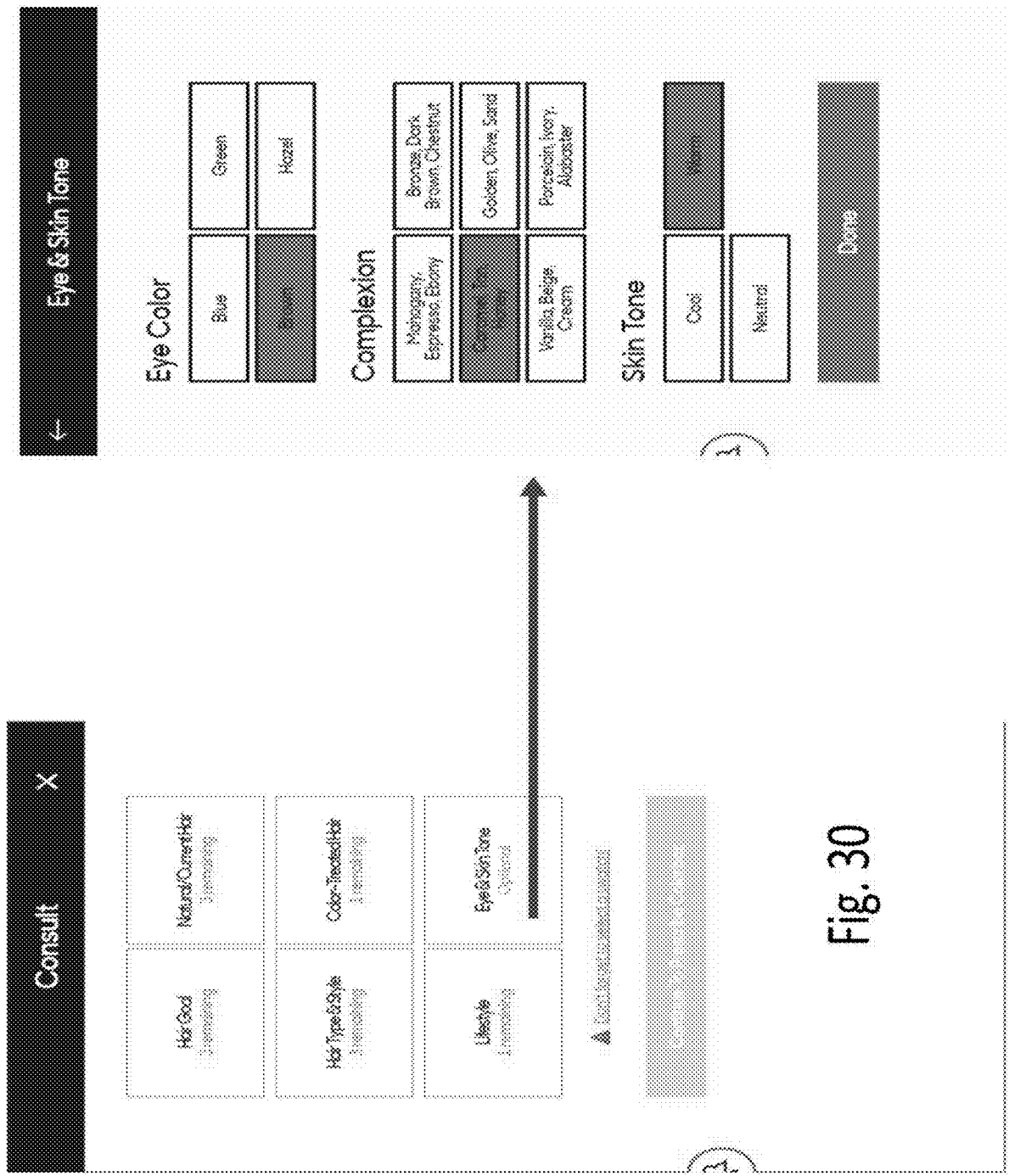

FIG. 25 shows that some selections may trigger an additional selection of "dependencies" (such as "vibrancy" if the end result of "copper, red, or violet" is selected.

FIGS. 26-30 show the different requirements which are triggered from the options shown on the "consult" screen.

Figure 32:
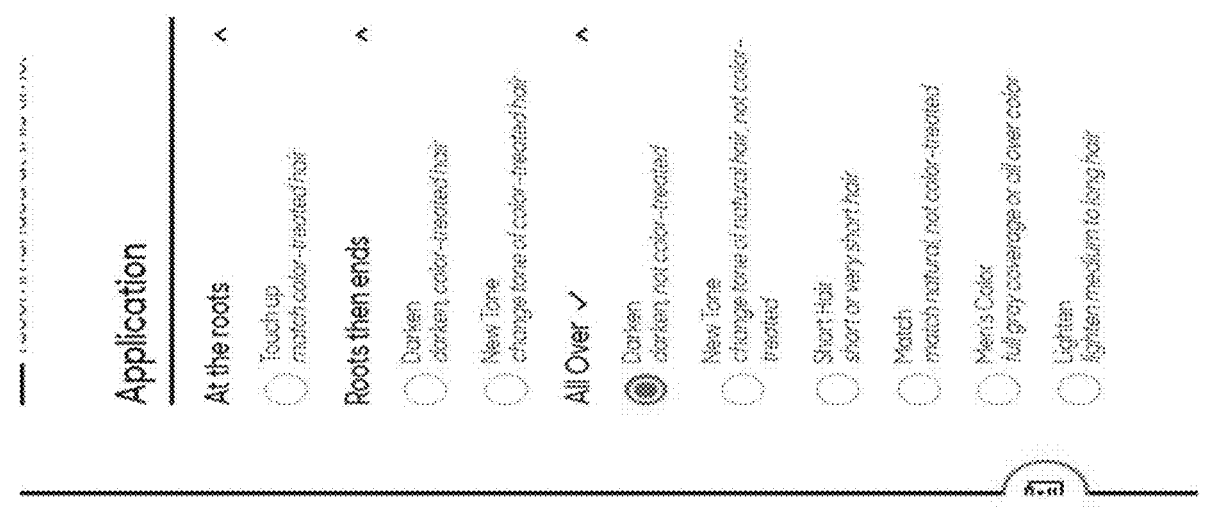

When the colorist completes input of all selections in the "consult" screen, in addition to selecting a hair goal from the inspiration swatches, a "prescribe screen" may be shown which summarizes the selections, and then further displays new options to specify an "application" of the hair dye for either "roots," "roots then ends," and "all over," a show in FIG. 32. Between selecting the application and the formula, the colorist chooses the service which then determines the set of personalized instructions the customer will receive.

Figure 33:
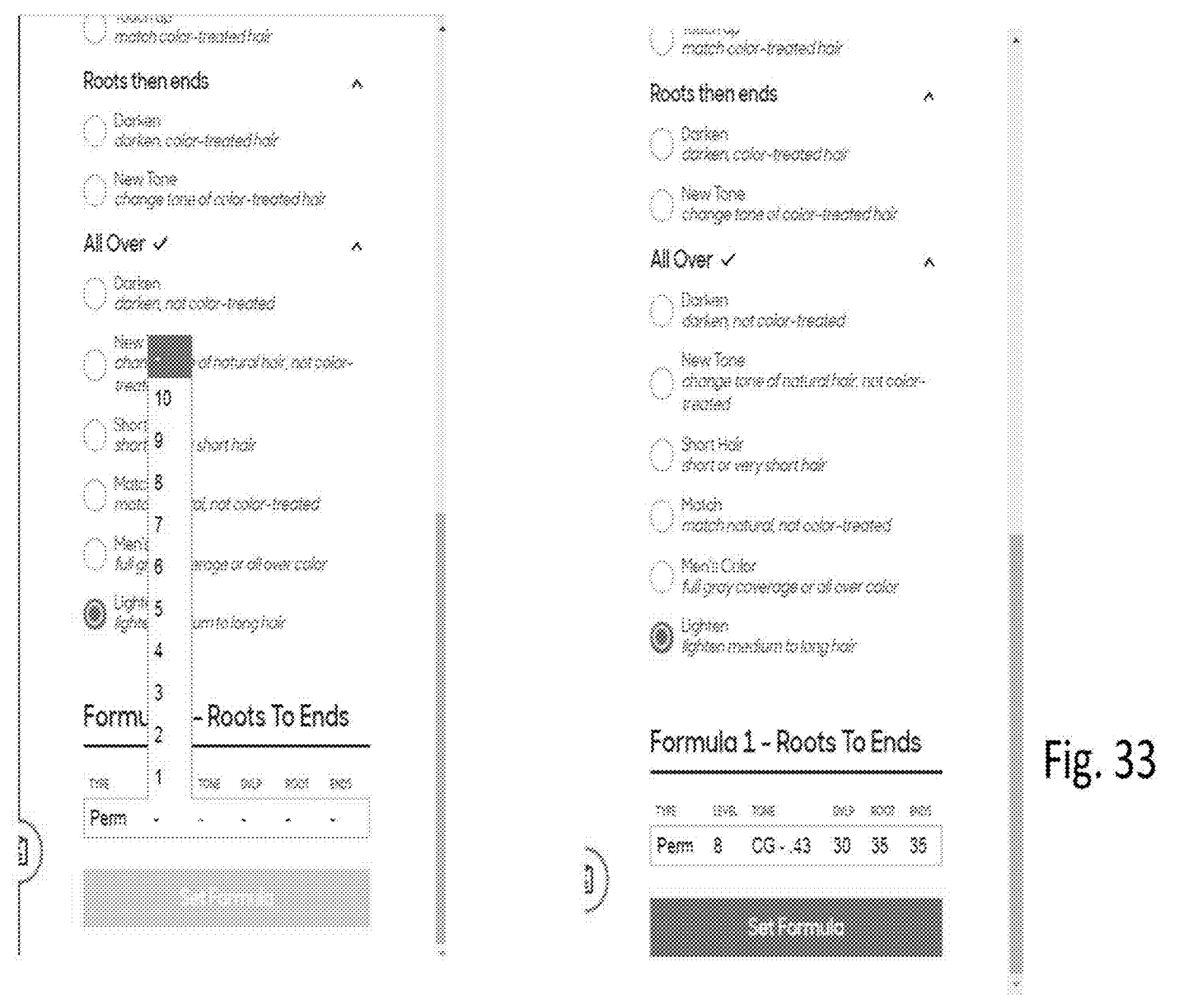

As shown in FIG. 33, once a selection of "application" is made, the colorist may then specify a particular formula that is characterized by type, level, tone, DVLP, a root value, and an "ends" value.

Figure 34:
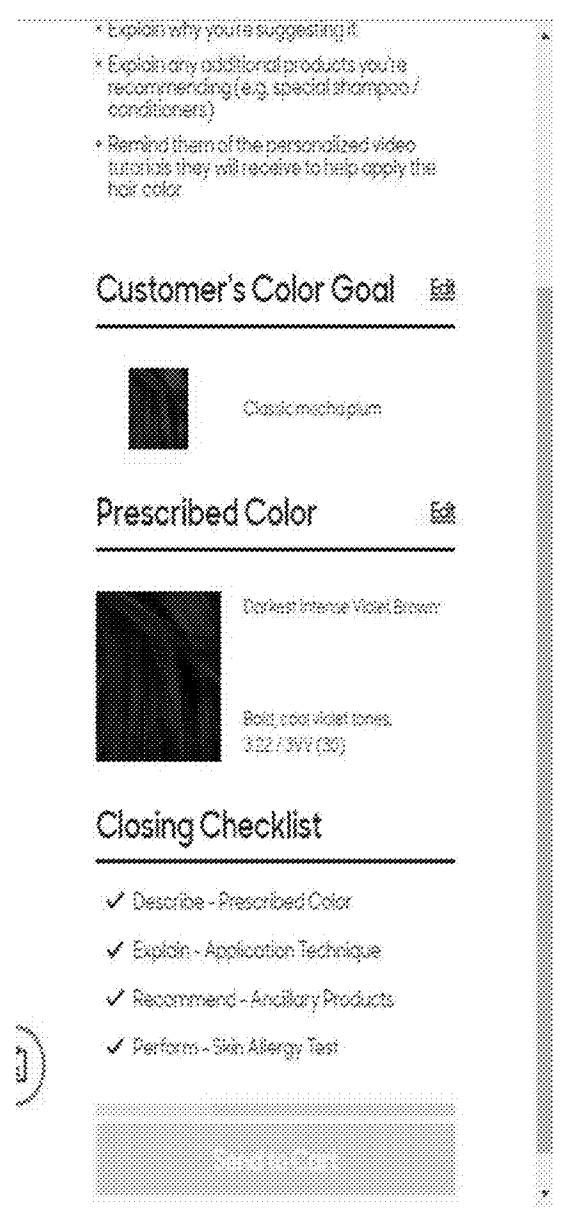

When all selections are finally made, a final screen is shown on FIG. 34, which shows the customer's color goal and the prescribed color. Additional options may be shown to remind the colorist of further explanations and recommendations he/she should mention.

When the steps are completed, the colorist sends the final product to a cart. When the consultation ends, the colorist is disconnected and the customer is directed automatically to their cart. The customer can then complete the purchase by entering payment information in order to purchase (via a secure connection to keep the payment information confidential). When the purchase is complete, the prescribed color will be sent to the fill site to dispense the custom hair dye as described above.

Figure 31:
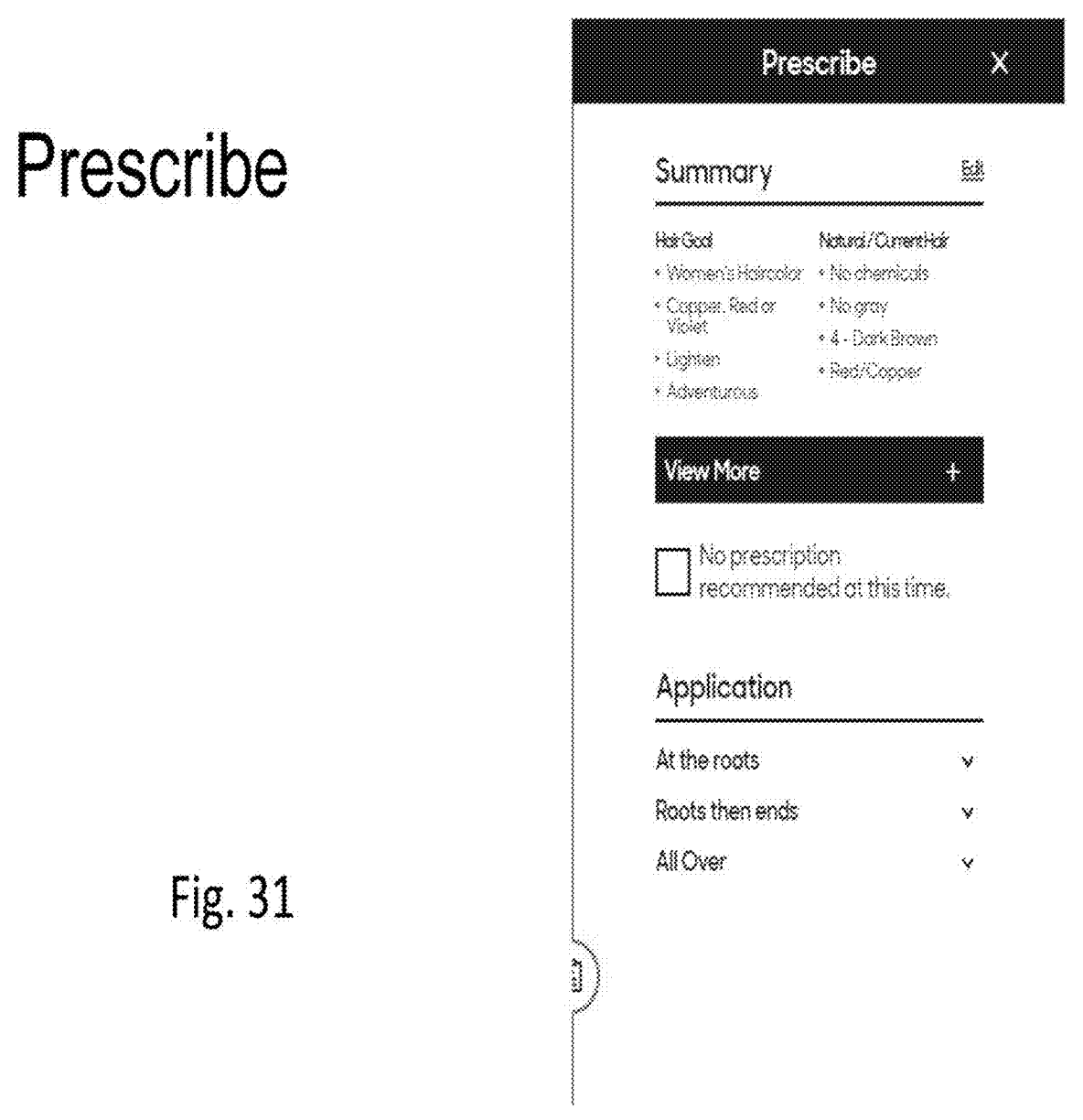

It is noted that if the colorist does not believe that a prescribed color can be given based on any concerns that come up during the video session, the colorist may select "No prescription recommended at this time" as shown in FIG. 31. In this event, the colorist may recommend that the customer visit a colorist in-person at a salon, and the application can facilitate connecting the customer to a particular salon for an appointment if necessary.

Figure 35:
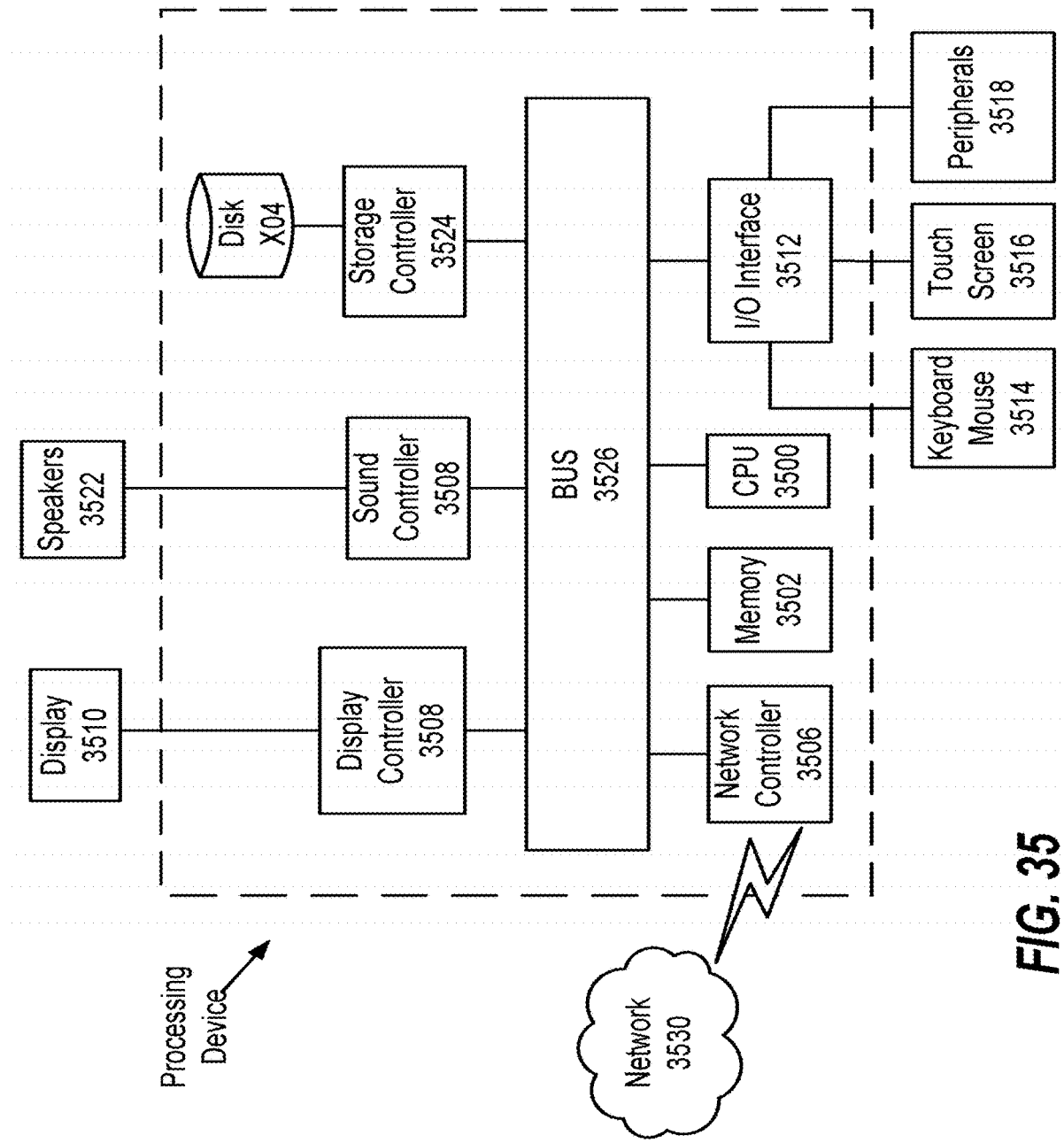
FIG. 35 shows an overview of the hardware components of a processing device according to an embodiment.

Next, a hardware description of a processing device utilized in the above descriptions according to exemplary embodiments is described with reference to FIG. 35. In FIG. 35, the computing includes a CPU 3500 which performs the processes described above/below. The process data and instructions may be stored in memory 3502. These processes and instructions may also be stored on a storage medium disk 3504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing device communicates, such as a server or computer.

Further, the claimed advancements may be provided as a utility application, background daemon, or component of an operating system, or combination thereof, executing in conjunction with CPU 3500 and an operating system such as Microsoft Windows, UNIX, Solaris, LINUX, Apple MAC-OS and other systems known to those skilled in the art.

The hardware elements in order to achieve the processing device may be realized by various circuitry elements, known to those skilled in the art. For example, CPU 3500 may be a Xenon or Core processor from Intel of America or an Opteron processor from AMD of America, or may be other processor types that would be recognized by one of ordinary skill in the art. Alternatively, the CPU 3500 may be implemented on an FPGA, ASIC, PLD or using discrete logic circuits, as one of ordinary skill in the art would recognize. Further, CPU 3500 may be implemented as multiple processors cooperatively working in parallel to perform the instructions of the inventive processes described above.

The processing device in FIG. 35 also includes a network controller 3506, such as an Intel Ethernet PRO network interface card from Intel Corporation of America, for interfacing with network 3530. As can be appreciated, the network 3530 can be a public network, such as the Internet, or a private network such as an LAN or WAN network, or any combination thereof and can also include PSTN or ISDN sub-networks. The network 3530 can also be wired, such as an Ethernet network, or can be wireless such as a cellular network including EDGE, 3G and 4G wireless cellular systems. The wireless network can also be WiFi, Bluetooth, or any other wireless form of communication that is known.

The processing device further includes a display controller 3508, such as a NVIDIA GeForce GTX or Quadro graphics adaptor from NVIDIA Corporation of America for interfacing with display 3510, such as a Hewlett Packard HPL2445w LCD monitor. A general purpose I/O interface 3512 interfaces with a keyboard and/or mouse 3514 as well as a touch screen panel 3516 on or separate from display 3510. General purpose I/O interface also connects to a variety of peripherals 3518 including printers and scanners, such as an OfficeJet or DeskJet from Hewlett Packard.

A sound controller 3520 is also provided in the processing device, such as Sound Blaster 35-Fi Titanium from Creative, to interface with speakers/microphone 3522 thereby providing sounds and/or music.

The general purpose storage controller 3524 connects the storage medium disk 3504 with communication bus 3526, which may be an ISA, EISA, VESA, PCI, or similar, for interconnecting all of the components of the processing device. A description of the general features and functionality of the display 3510, keyboard and/or mouse 3514, as well as the display controller 3508, storage controller 3524, network controller 3506, sound controller 3520, and general purpose I/O interface 3512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

A processing device used by a user (customer) s configured to upload data regarding the user to an external system or server (such as a cloud-based system). The processing device can also provide an option to keep the user data anonymous.

Furthermore, the circuitry of the processing device may be configured to actuate a discovery protocol that allows the processing device and a system to identify each other and to negotiate one or more pre-shared keys, which further allows the system and the processing device to exchanged encrypted and anonymized information. The discovery protocol may further allow the client device and system to exchange treatment regimen information.

Figure 36:
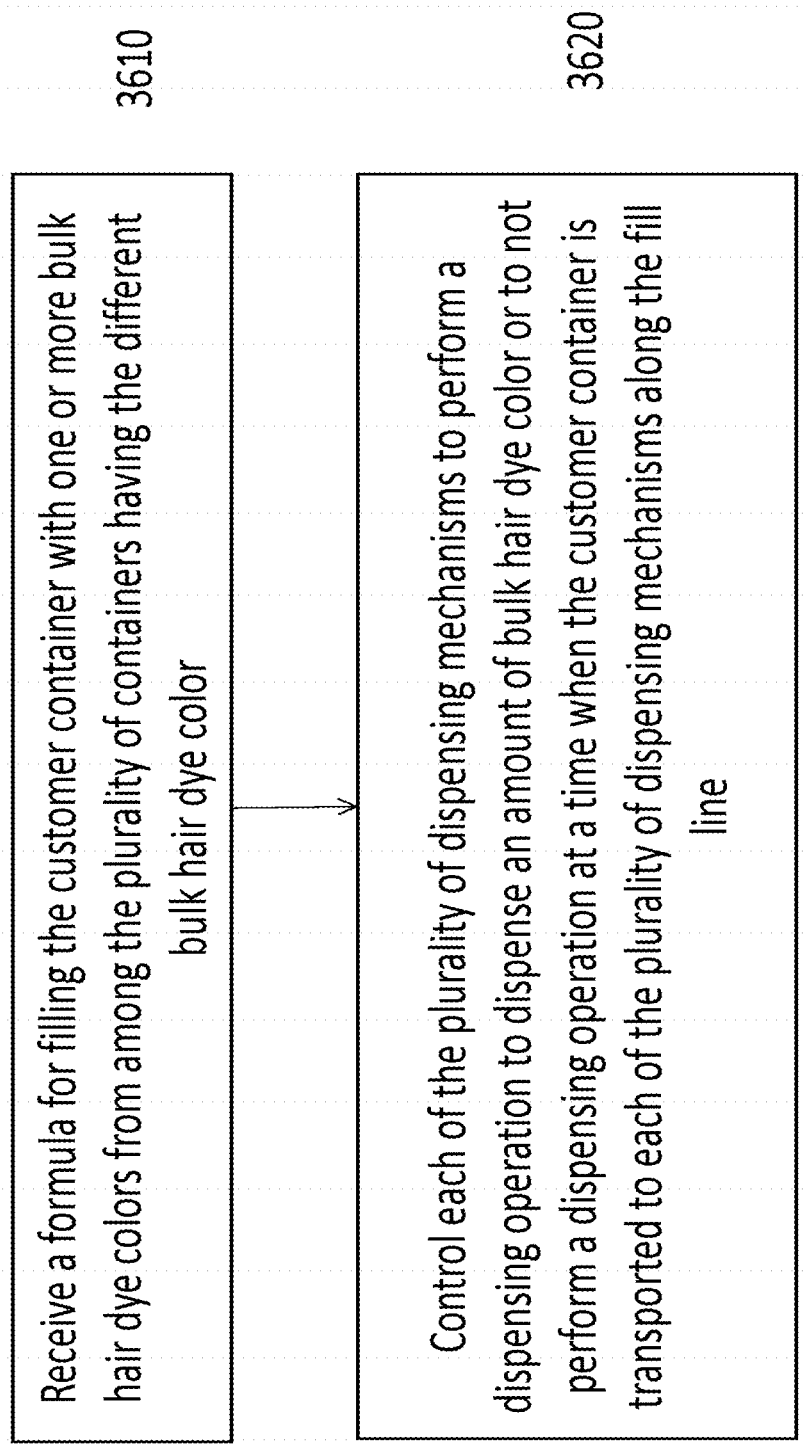
FIG. 36 shows a process performed at a fill site according to an embodiment.

The above-described hardware description is a non-limiting example of corresponding structure for performing the functionality described herein. FIG. 36 shows a process or algorithm performed by circuitry of the fill line site controller 1540 (see FIG. 15) according an embodiment. In step 3610, the circuitry receives a formula for filling the customer container with one or more bulk hair dye colors from among the plurality of containers having the different bulk hair dye color. In step 3620, the circuitry control each of the plurality of dispensing mechanisms to perform a dispensing operation to dispense an amount of bulk hair dye color or to not perform a dispensing operation at a time when the customer container is transported to each of the plurality of dispensing mechanisms along the fill line.

FIG. 37 shows a process or algorithm performed by circuitry one or more devices in the system shown in FIG. 15 above, such as at least the server 1530. In step 3710, the circuitry establishes a connection with a user device of the particular customer over a network. In step 3720, the circuitry receives a selection of a preferred type of expertise of a colorist. In step 3730, the circuitry determines an available colorist that corresponds to the preferred type of expertise. In step 3740, the circuitry establishes a video communication session between the particular customer and a colorist device of the determined colorist. In step 3750, the circuitry causes display of a customer interface to the customer at the user device which is configured to display options for specifying a target type of hair color. In step 3760, the circuitry causes display of a colorist interface to the colorist device which is configured to display options, different from the display options at the user device, for inputting information about the particular customer and the target type of hair color, and for inputting information used to generating the custom hair dye formulation. In step 3770, the circuitry transmits the generated custom hair dye formulation to a fill site, via the network. Subsequently, controller 1540 controls the fill site to dispense one or more of a plurality of bulk hair dye colors into the single customer container based on the generated custom hair dye formulation.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A system for generating a custom hair dye formulation to be dispensed into a single customer container for a particular customer, comprising:
   processing circuitry configured to
      establish a connection with a user device of the particular customer over a network,
      receive a selection of a preferred type of expertise of a colorist,
      determine an available colorist that corresponds to the preferred type of expertise,
      establish a video communication session between the particular customer and a colorist device of the determined colorist,
      cause display of a customer interface to the customer at the user device which is configured to display options for specifying a target type of hair color,
      cause display of a colorist interface to the colorist device which is configured to display options, different from the display options at the user device, for inputting information about the particular customer and the target type of hair color, and for inputting information used to generating the custom hair dye formulation, and
      transmit the generated custom hair dye formulation to a fill site, via the network,
   wherein the fill site is caused to dispense one or more of a plurality of bulk hair dye colors into the single customer container based on the generated custom hair dye formulation.

* * * * *